(12) United States Patent
Tong et al.

(10) Patent No.: US 10,036,864 B2
(45) Date of Patent: Jul. 31, 2018

(54) FIBER OPTIC SPLICE PROTECTION DEVICE AND METHOD FOR MOUNTING THE SAME

(71) Applicant: ADC Telecommunications (Shanghai) Distribution Co., Ltd., Shanghai (CN)

(72) Inventors: Zhaoyang Tong, Shanghai (CN); Jiangzhen Xia, Shanghai (CN)

(73) Assignee: ADC TELECOMMUNICATIONS (SHANGHAI) DISTRIBUTION CO., LTD. (CN)

( * ) Notice: Subject to any disclaimer, the term of this patent is extended or adjusted under 35 U.S.C. 154(b) by 0 days.

(21) Appl. No.: 15/304,356

(22) PCT Filed: Apr. 15, 2015

(86) PCT No.: PCT/CN2015/076683
§ 371 (c)(1),
(2) Date: Oct. 14, 2016

(87) PCT Pub. No.: WO2015/158269
PCT Pub. Date: Oct. 22, 2015

(65) Prior Publication Data
US 2017/0031123 A1 Feb. 2, 2017

(30) Foreign Application Priority Data

Apr. 15, 2014 (CN) .......................... 2014 1 0150778

(51) Int. Cl.
| G02B 6/36 | (2006.01) |
| G02B 6/44 | (2006.01) |
| G02B 6/255 | (2006.01) |

(52) U.S. Cl.
CPC ......... *G02B 6/4446* (2013.01); *G02B 6/2558* (2013.01); *G02B 6/36* (2013.01); *G02B 6/44* (2013.01); *G02B 6/4471* (2013.01)

(58) Field of Classification Search
CPC .. G02B 6/4446; G02B 6/4471; G02B 6/2558; G02B 6/36; G02B 6/44
See application file for complete search history.

(56) References Cited

U.S. PATENT DOCUMENTS 5,519,804 A 5/1996 Burek et al.
5,684,911 A 11/1997 Burgett
(Continued)

FOREIGN PATENT DOCUMENTS

CN 2867366 2/2007
CN 101504479 A 8/2009
(Continued)

OTHER PUBLICATIONS

International Search Report for corresponding International Patent Application No. PCT/CN2015/078883 dated Jun. 12, 2015, 4 pgs.
Extended European Search Report for Application No. 15780670.4 dated Nov. 7, 2017.

*Primary Examiner* — Ryan Lepisto
(74) *Attorney, Agent, or Firm* — Merchant & Gould P.C.

(57) ABSTRACT

The present disclosure is directed to a fiber optic splice protection device. In one aspect, the device includes a closure including a cover and a chassis, and a fiber routing management unit mounted on the chassis of the closure. The fiber routing management unit can include a bottom member, flexible clippers, which are removably mounted on top of the bottom member; and a resilient biasing member, mounted on the chassis of the closure. The biasing member applies an elastic biasing force to the bottom member such that the bottom member is pressed against fiber optic cables to be spliced under the action of the elastic biasing member. The disclosed device avoids the phenomenon of messy winding of the fiber optic jacket and the fiber optic, and increases the winding space of the cable.

17 Claims, 23 Drawing Sheets

(56) References Cited

U.S. PATENT DOCUMENTS

| | | | |
|---|---|---|---|
| 5,824,961 A | 10/1998 | Burek et al. | |
| 6,081,644 A | 6/2000 | Stateczny et al. | |
| 6,269,214 B1 | 7/2001 | Naudin et al. | |
| 7,603,018 B2 | 10/2009 | Mullaney et al. | |
| 7,738,761 B2 * | 6/2010 | Mullaney | G02B 6/4447 385/134 |
| 8,929,708 B2 | 1/2015 | Pimentel et al. | |
| 9,423,029 B2 | 8/2016 | Coenegracht et al. | |
| 2004/0013387 A1 | 1/2004 | Wakileh et al. | |
| 2009/0058018 A1 | 3/2009 | Mullaney et al. | |
| 2009/0110361 A1 | 4/2009 | Yamada | |
| 2010/0054689 A1 | 3/2010 | Mullaney et al. | |
| 2010/0092147 A1 | 4/2010 | Desard et al. | |
| 2015/0117829 A1 | 4/2015 | Allen | |
| 2015/0268435 A1 | 9/2015 | Blackwell, Jr. et al. | |
| 2017/0038547 A1 | 2/2017 | Tong et al. | |
| 2017/0131498 A1 | 5/2017 | Tong et al. | |

FOREIGN PATENT DOCUMENTS

| | | |
|---|---|---|
| CN | 101900856 A | 12/2010 |
| CN | 102062913 A | 5/2011 |
| CN | 102073112 A | 5/2011 |
| CN | 102841414 A | 12/2012 |
| CN | 202676969 U | 1/2013 |
| CN | 202904081 U | 4/2013 |
| CN | 103383484 A | 11/2013 |
| CN | 203149170 U | 8/2014 |
| CN | 203773116 U | 8/2014 |
| CN | 203773117 U | 8/2014 |
| CN | 203773118 U | 8/2014 |
| EP | 2 012 155 A1 | 1/2009 |
| WO | 97/27655 A1 | 7/1997 |
| WO | 2009/045689 A2 | 4/2009 |
| WO | 2013/091716 A1 | 6/2013 |
| WO | 2013/117484 A2 | 8/2013 |

* cited by examiner

FIBER OPTIC SPLICE PROTECTION DEVICE AND METHOD FOR MOUNTING THE SAME

FIELD OF TECHNOLOGY

The present invention relates to a fiber optic splice protection device.

BACKGROUND

In the optical communication network, because of the limited length of the cable and requirement of branching and cross-connecting of the cable on the transmission line, it needs to splice the cable and protect the splice so as to ensure the splice can withstand external factors, such as changes in temperature, humidity and mechanical drawing, etc., to realize work with all weather. The usual practice is to use cable splicing device to provide conditions for splicing, branching and cross-connecting a cable and realize integrity protection for the splice. Overhead cable, straight-through connection, branch and cross-connection of a pipeline often utilize the way of cable splice device to meet the protection needs of the internet connection between a cable main trunk cable and a wiring cable network. Cable splicing devices are generally required to have features, such as high mechanical strength, good sealing performance, good corrosion resistance, convenient splice, and supporting repeatedly turned on and so on. However, there are some shortcomings in present cable splicing device, such as bulky, inconvenient operation and high cost.

Existing fiber optic splice protection device comprises a cover and a chassis. A fixing device of a cable strength member, a slot of fiber optic splice protection jacket and a cable fastening tape are integrally formed with the chassis. Seal locking between the cover and the chassis is made by way of a seal component and a screw. Shortcoming of the existing Cable splicing device is that it is required to fix the cable strength members in the chassis one by one cable so as to make on-site installation inconvenient. At the same time, it also makes on-site installation inconvenient that the cover and the chassis are fixed by a plurality of screws. Further, in the existing fiber optic splice protection device, there is structure for managing the fiber optic jacket, resulting in the phenomenon of winding and messy of the fiber optic jacket and the fiber optic.

SUMMARY

The purpose of the present invention is to solve the above-mentioned prior art problems and drawbacks of at least one aspect.

One object of the present invention is to provide a fiber optic splice protection device, which can fix a cable to be spliced at a one-time to a chassis of a closure of a fiber optic splice protection device, so as to realize on-site rapid installation.

Another object of the present invention is to provide a fiber optic splice protection device, a cover of the closure of which can be easily turned on repeatedly, and good sealing performance can be achieved between the cover of the closure and the chassis of the closure.

Another object of the present invention is to provide a fiber optic splice protection device having a structure for managing the fiber optic jacket so as to avoid the phenomenon of winding and messy of the fiber optic jacket and the fiber optic.

Another object of the present invention is to provide a fiber optic splice protection device, with simple structure, small size and low cost.

Another object of the present invention is to provide a fiber optic splice protection device with high mechanical strength, excellent corrosion resistance.

According to one aspect of the present invention, there is provided a fiber optic splice protection device, comprising: a closure including a cover and a chassis; and at least one cable fixer for fixing cables to be spliced to the chassis of the closure, wherein the cable fixer is a separate member separated from the chassis, and is removably mounted in the chassis of the closure; and all strength members of the cables to be spliced are previously fixed to the cable fixer before the cable fixer is mounted to the chassis of the closure.

According to an exemplary embodiment of the present invention, each of the cable fixer comprises a strength member fixation unit for fixing the strength members of the cables to be spliced.

According to another exemplary embodiment of the present invention, the strength member fixation unit comprises cylindrical projections and threaded fasteners. The cylindrical projections project from surface of the cable fixer, threaded bores extending along axial direction of the cylindrical projections and strength member holes penetrating through the threaded bores along radial direction of the cylindrical projections are formed on the cylindrical projections, the strength members of the cable penetrate through the strength member holes. The threaded fasteners are screwed into the threaded bores of the cylindrical projection for fixing the strength members penetrated through the strength member holes to the cylindrical projections.

According to another exemplary embodiment of the present invention, each of the cable fixers further includes fastening strips. The fastening strips bound the outer sheath of the cable to ends of the cable fixer.

According to another exemplary embodiment of the present invention, each of the cable fixers has an elongated body. Cable receiving grooves extending along the longitudinal direction of the elongated body are respectively formed in two ends of the elongated body. The outer sheaths of the cable are accommodated the cable receiving grooves. Necks inwardly contracted along width direction of the elongated body are respectively formed at two ends of the elongated body. The fastening strips are positioned at the necks, and bound the outer sheathes of the cables to the necks.

According to another exemplary embodiment of the present invention, the surface of the cable receiving grooves is uneven surface so as to increase frictional holding force.

According to another exemplary embodiment of the present invention, intermediate portion of the elongated body is a flat portion, and its height is lower than that of two ends of the elongated body, so that projected positioning edges are formed at two ends of the intermediate portion of the elongated body. The positioning edges are used for determining length of the outer sheathes of the cables fixed on the cable fixer.

According to another exemplary embodiment of the present invention, the pair of cylindrical projection is formed at the intermediate portion of the elongated body According to another exemplary embodiment of the present invention, the unit is mounted to the chassis of the closure by screws.

According to another exemplary embodiment of the present invention, a plurality of fixation holes are formed on the intermediate portion of the elongate body, threaded bores corresponding to the plurality of fixation holes are formed, respectively, in bottom surface of the chassis of the closure. The screws pass through the fixation holes of the elongated body and are screwed into the threaded bores of the chassis so as to fix the cable fixer to the chassis of the closure.

According to another exemplary embodiment of the present invention, the strength member fixation unit comprises: a box-shaped accommodating portion and a pressing block. The box-shaped accommodating portion is formed on the surface of the cable fixer, the box-shaped accommodating portion has four walls projecting from the surface of the cable fixer, and strength member holes are formed in the end wall of the box-shaped accommodating portion, a first strength member fixation groove is formed on the bottom surface of the box-shaped accommodating portion, the strength members of the cables penetrates through the strength member holes and are received in the first strength member fixation groove. The pressing block is accommodated in the box-shaped accommodating portion and is fastened to bottom of the box-shaped accommodating portion by the screws, so as to squeeze the strength members, which penetrated through the strength member holes of the box-shaped accommodating portion, in the first strength member fixation groove. The pressing block is an integral member for squeezing and fixing the strength members of the cables to be spliced.

According to another exemplary embodiment of the present invention, threaded bores are formed in bottom surface of the box-shaped accommodating portion, and fixing holes are formed on the pressing block, the screws pass through the fixing holes of the pressing block and are screwed into the threaded bores of the box-shaped accommodating portion, so as to fasten the pressing block to bottom of the box-shaped accommodating portion.

According to another exemplary embodiment of the present invention, a second strength member fixation groove is also formed on the pressing block. The strength members are squeezed between the first strength member fixation groove and the second strength member fixation groove.

According to another exemplary embodiment of the present invention, the surfaces of the first strength member fixation groove and/or the second strength member fixation groove are uneven surfaces so as to increase friction holding force for the strength members.

According to another exemplary embodiment of the present invention, the strength member fixation unit comprises: a box-shaped accommodating portion formed on the surface of the cable fixer, the box-shaped accommodating portion has four walls projecting from the surface of the cable fixer, and strength member holes are formed in the end wall of the box-shaped accommodating portion, a first strength member fixation groove is formed on the bottom surface of the box-shaped accommodating portion, the strength members of the cables penetrates through the strength member holes and are accommodated in the first strength member fixation groove; and a pressing block, accommodated in the box-shaped accommodating portion and fastened to bottom of the box-shaped accommodating portion by the screws, so as to squeeze the strength members, which penetrated through the strength member holes of the box-shaped accommodating portions, in the first strength member fixation groove, the pressing block includes a first block and a second block, the first block and the second block are mutually pivotally connected together, and the first block is used to individually squeeze and fix the strength members of the first cable of the cables to be spliced, the second block is used to individually squeeze and fix the strength members of the second cable of the cables to be spliced.

According to another exemplary embodiment of the present invention, threaded bores are formed in bottom surface of the box-shaped accommodating portion and fixing holes are formed on the pressing block, and the screws pass through the fixing holes of the pressing block and are screwed into the threaded bores of the box-shaped accommodating portion, so as to fasten the pressing block to bottom of the box-shaped accommodating portion.

According to another exemplary embodiment of the present invention, a second strength member fixation groove is formed on the pressing block, the strength members are squeezed between the first strength member fixation groove and the second strength member fixation groove.

According to another exemplary embodiment of the present invention, surfaces of the first strength member fixation groove and/or the second strength member fixation groove are uneven surfaces so as to increase friction holding force for the strength members.

According to another exemplary embodiment of the present invention, the fiber optic splice protection device comprises a plurality of cable fixers for fixing a plurality of pairs of cables to be spliced to the chassis of the closure.

According to another exemplary embodiment of the present invention, a method for mounting a fiber optic splice protection device is provided, comprising:
 providing a cable fixer, which is separated from a chassis of a closure of the fiber optic splice protection device,
 fixing strength members and outer sheathes of the cables to be spliced to the cable fixers;
 fixing the cable fixer, on which the cables to be spliced are previously fixed, to the chassis of the closure; and
 closing a cover of the closure to the chassis of the closure.

According to another exemplary embodiment of the present invention, a fiber optic splice protection device is provided, comprising: a closure including a cover and a chassis; and a fiber routing management unit, mounted on the chassis of the closure, wherein the fiber routing management unit comprises: a bottom sheet; flexible sheets, which are removably mounted on top of the bottom sheet; and an elastic biasing member, mounted on the chassis of the closure, for applying elastic biasing force to the bottom sheet, wherein the bottom sheet is pressed against fiber jackets of the cables to be spliced under the action of the elastic biasing member, so as to prevent the fiber jackets from being messily wound; and wherein optical fibers of the cables to be spliced are positioned above the bottom sheet, wound along a no bending loss path defined by the flexible sheets, and orderly restrained in an appropriate location by the flexible sheets.

According to another exemplary embodiment of the present invention, the elastic biasing member comprises a pair of torque springs, a pair of mounting shafts facing to each other are formed on one side of the bottom of the bottom sheet, and the pair of torque springs are sleeved on the pair of mounting shafts, respectively.

According to another exemplary embodiment of the present invention, a fiber jacket slot is formed on bottom surface of the chassis of the closure; fiber jackets are placed in the fiber jacket slot and pressed under the bottom sheet.

According to another exemplary embodiment of the present invention, the bottom sheet may be a flexible sheet-like member.

According to another exemplary embodiment of the present invention, the fiber routing management unit further includes a flexible spacer, the flexible spacer is covered on the fiber jackets, and the bottom sheet is pressed on the flexible spacer.

According to another exemplary embodiment of the present invention, a plurality of protruded insertion sheets are formed on upper surface of the bottom sheet; flexible sheets each comprises legs and a plurality of teeth-like portions located at upper end of the legs; insertion holes are formed in lower ends of the legs, the insertion sheets are inserted into the inserting holes, respectively, so that the flexible sheets are assembled to the bottom sheet.

According to another exemplary embodiment of the present invention, a plurality of flexible sheets are provided at each of the bottom sheets, and teeth-like portions of adjacent two flexible sheets are alternately arranged.

According to another exemplary embodiment of the present invention, the flexible sheets comprise a first flexible sheet and a second flexible sheets mounted at each of the bottom sheets, and the first flexible sheet and the second flexible sheet are spaced from and faced to each other.

According to another exemplary embodiment of the present invention, the first flexible sheet is provided at a location near the side wall of the chassis of the closure, and the second flexible sheet is provided at a location near a side of the first flexible sheet far away from the side wall of the chassis.

According to another exemplary embodiment of the present invention, a plurality of first teeth-like portions are formed on only one side of the first flexible sheet facing the second flexible sheets; and a plurality of second teeth-like portions are formed on only one side of the second flexible sheet facing the first flexible sheets.

According to another exemplary embodiment of the present invention, a plurality of first teeth-like portions are formed on only one side of the first flexible sheet facing the second flexible sheets; and a plurality of second teeth-like portions are formed on one side of the second flexible sheet facing the first flexible sheets and the other side far away from the first flexible sheet.

According to another exemplary embodiment of the present invention, a third flexible sheet is provided on each of the bottom sheet, the third flexible sheet is arranged at a location near the other side of the second flexible sheet, and a plurality of third teeth-like portions are formed on only one side of the third flexible sheet facing the second flexible sheet.

According to another exemplary embodiment of the present invention, two pairs of fiber routing management units are mounted in the chassis of the closure, in which one pair of fiber routing management units are arranged in the middle location between two longitudinal ends of the chassis, and the other pair fiber routing management unit are arranged in the middle location between two lateral ends of the chassis.

According to another exemplary embodiment of the present invention, a row of slots are formed in the middle of the chassis of the closure for holding fiber optic splice protective jackets.

According to another exemplary embodiment of the present invention, a method for mounting a fiber optic splice protection device is provided, comprising:
  providing a cable fixer, which is separated from a chassis of a closure of the fiber optic splice protection device,
  fixing strength members and outer sheathes of the cables to be spliced to the cable fixers;
  fixing the cable fixer, on which the cables to be spliced are previously fixed, to the chassis of the closure;
  placing fiber jackets in fiber jacket slots, and pressing the fiber jackets by a bottom sheet of a fiber routing management unit; and
  closing a cover of the closure to the chassis of the closure.

The method above further comprises the step of covering a flexible spacer on the fiber jackets before pressing the fiber jackets by the bottom sheet.

According to another exemplary embodiment of the present invention, a fiber optic splice protection device, comprising: a closure including a cover and a chassis; wherein a circle of groove is formed on mating edge of four walls of one of the cover and the chassis, and an elastic sealing member is placed in the groove; a circle of projection is formed on mating edge of four walls of the other of the cover and the chassis; the cover is adapted to be locked on the chassis, when the cover is locked on the chassis, the projection is pressed against the elastic sealing member and embedded into the groove, so as to achieve the seal locking between the cover and the chassis.

According to another exemplary embodiment of the present invention, the circle of groove is formed on upper mating edge of four walls of the chassis, and the circle of projection is formed on lower mating edge of four walls of the cover.

According to another exemplary embodiment of the present invention, the cover is locked to at least one side of the chassis by a locking device.

According to another exemplary embodiment of the present invention, the cover and one side of the chassis are pivotally connected together by a hinge, and the cover and the other side of the chassis are mutually locked together by the locking device.

According to another exemplary embodiment of the present invention, the cover and one side of the chassis are mutually locked together by the locking device, and the cover and the other side of the chassis are mutually locked together by the locking device.

According to another exemplary embodiment of the present invention, the locking device comprises a snap structure, and the snap structure comprising: an elastic hook formed on the cover; and a notch formed in the chassis, wherein when the elastic hook is inserted and snapped into the notch, the cover and chassis are locked together.

According to another exemplary embodiment of the present invention, the locking device comprises a cam locking mechanism, the cam locking mechanism comprises: a snapping plate, connected to the cover; a sliding plate slidably mounted on the snapping plate and may slide along the snapping plate; a rotating circular plate rotatably mounted on the sliding plate; an eccentric cam member, connected to the rotating circular plate and offset from the center of the rotating circular plate by a predetermined distance, and the eccentric cam member is joined to a notch formed in the snapping plate; a shaft member connected to the lower end of the sliding plate; and a slot formed on the chassis, the shaft member is retained in the slot, wherein when the rotating circular plate is rotated, the eccentric cam member moves between a locked position of locking the cover to the chassis and an unlocked position of releasing the cover from chassis; wherein when the eccentric cam member moves toward the locked position, the eccentric cam member drives the sliding plate and the snapping plate to move in a direction toward each other, so as to apply a tension force to the cover and the chassis and achieve the locking between the cover and the chassis; and wherein when the eccentric cam member is moving toward the unlocked position, the eccentric cam member drives the sliding plate and the snapping plate to move in a direction far away from each other, so as to release the cover from the chassis.

According to another exemplary embodiment of the present invention, a rotating wrench is connected to the rotating circular plate, for applying a rotational force to the rotating circular plate.

According to another exemplary embodiment of the present invention, an insertion hole, into which a force arm tool is to be inserted, is formed in the rotating circular plate, so as to impart a rotational force to the rotating circular plate by the force arm tool.

According to another exemplary embodiment of the present invention, the eccentric cam member has disk-shape and has a diameter smaller than that of the rotating circular plate.

According to another exemplary embodiment of the present invention, the eccentric cam member has oval-shape with a long-axis having a length less than the diameter of the rotating circular plate.

According to another exemplary embodiment of the present invention, a pair of rib projections are formed on side of the chassis, and the sliding plate and the snapping plate of each cam locking mechanism are located between the respective pair of projecting ribs.

According to another exemplary embodiment of the present invention, the slot is formed on the lower end of each pair of projecting ribs; two ends of the shaft member are locked into the slot.

According to another exemplary embodiment of the present invention, cable receiving slots are formed on the side wall of the chassis; the cables to be spliced are accommodated in the cable receiving slots.

According to another exemplary embodiment of the present invention, the outer side wall of the chassis is formed with a holder knob.

According to another exemplary embodiment of the present invention, a number of mutually crossing longitudinal and transverse strength ribs are formed on the outer surface of the cover.

According to another exemplary embodiment of the present invention, a ruler is formed on the strength ribs, to provide on-site installation measurement function for measuring length.

According to another exemplary embodiment of the present invention, a method for mounting a fiber optic splice protection device is provided, comprising:

providing a cable fixer, which is separated from a chassis of a closure of the fiber optic splice protection device;

fixing strength members and outer sheathes of the cables to be spliced to the cable fixer;

fixing the cable fixer, on which the cables to be spliced are previously fixed, to the chassis of the closure;

placing a sealing member into the groove of the chassis; and closing a cover of the closure to the chassis of the closure.

The difference between the present invention and the prior art is to simplify the design structure of a fiber optic splice protection device, so that on-site splicing and protecting operation becomes easy and fast. On-site operators will strip cable until length of each part is a desired fixed length, the cable is fixed to a strength member fixation unit of the cable fixer, and then the cable is fixed to corresponding position in the cable fixer by a lashing member, and then the jacket cables are arranged chassis groove of the splice device located below a fiber routing management unit, the exposed primary coated optical fibers are inserted into fiber optic splice protective jackets, the cables are striped, cleaned, cut and then spliced, after that, the protective jackets protecting the splice of the cable are performed necessary processing (such as thermal), and then, the remain cables are accommodated in the fiber routing management unit, while the fiber optic splice protective jackets are sequentially disposed within the corresponding groove of the fiber optic splice protection device. The groove mates with the protective jacket in mechanical fitting manner, and the groove is component integrated with the chassis of the closure. At least two the fiber routing management units are installed on the chassis, with two basic functions: firstly, a restricted space formed between the fiber routing management unit and the groove of the chassis is used to place the fiber jacket/outgoing optical fiber of the cable, and separate it from the remain fiber of the spliced portion; secondly, the fiber routing management units serves as a device of the chassis, increasing the fiber routing space of the cable and facilitating to fix the position of the cable so as to consequently place the cable in the splice device. The closure of the fiber optic splice protection device includes a cover and a chassis, a seal filled in the slot between the cover and the chassis is used to lock and seal by pressing the cover and the chassis, without some special tools are used to achieve the seal. Therefore, dependence on the profession of the works is reduced; complete protection of the splice is performed by simply operation of molting, routing and closing the optical fiber in two cables. When some spliced optical fiber need to be maintained, the closure of the cover and the chassis may be released by a simply tool, and after the maintenance required is finished, the cover may be closed again to achieve complete protection.

Other objects and advantages of the present invention will become apparent, and can help to have a thorough understanding of the present invention by the following description of the invention with reference to the accompanying drawings made.

DETAILED DESCRIPTION OF PREFERRED EMBODIMENTS OF THE INVENTION

Figure 1:
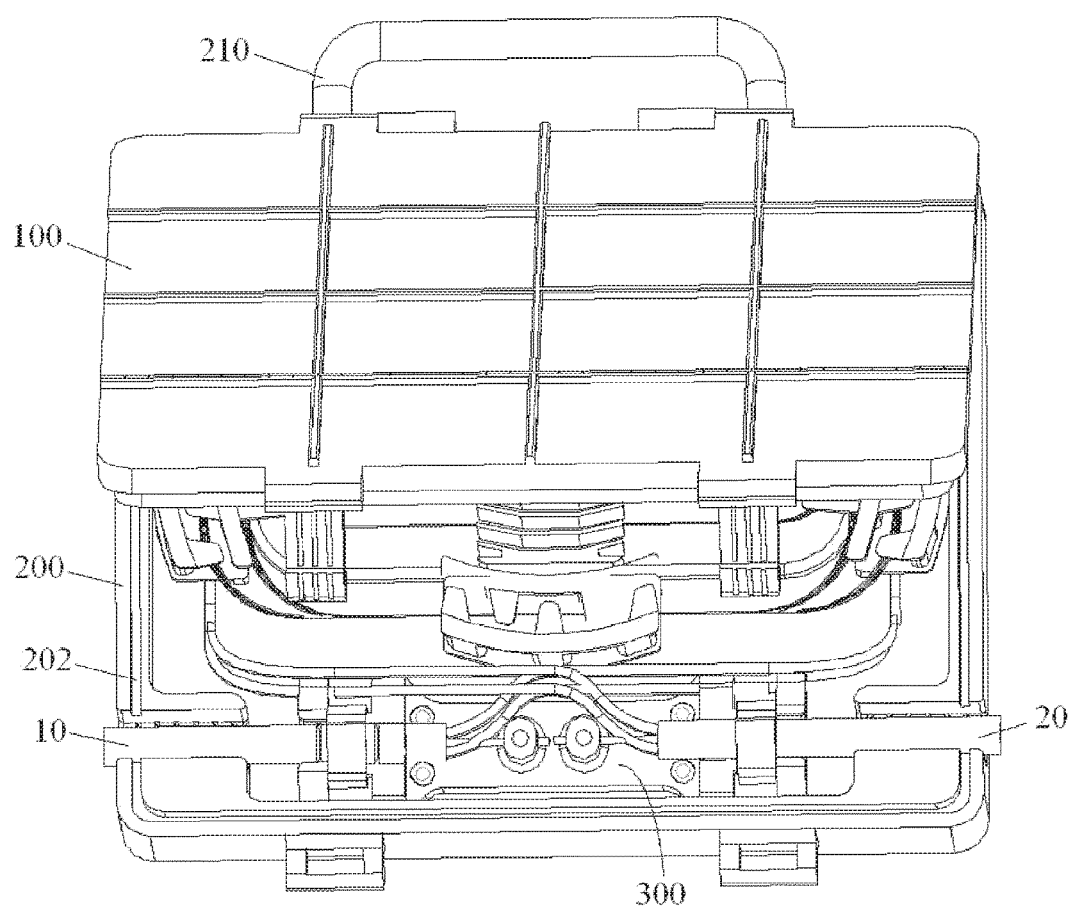
FIG. 1 shows a perspective schematic view of a fiber optic fiber optic splice protection device according to an exemplary embodiment of the present invention.

Specific embodiments of the present invention will be further described hereinafter in detail in conjunction with the attached drawings. In the specification, the same or similar reference numerals indicate the same or similar parts. The following embodiments are intended to illustrate the present invention, but not to limit scopes of the present invention.

According to a general concept of the present invention, there is provided a fiber optic splice protection device, comprising: a closure including a cover 100 and a chassis 200; and at least one cable fixer 300 for fixing cables to be spliced 10, 20 to the chassis 200 of the closure, wherein the cable fixer 300 is a separate member separated from the chassis 200, and is removably mounted in the chassis 200 of the closure; and all strength members of the cables to be spliced 10, 20 are previously fixed to the cable fixer 300 before the cable fixer 300 is mounted to the chassis 200 of the closure.

FIG. 1 shows a perspective schematic view of a fiber optic fiber optic splice protection device according to an exemplary embodiment of the present invention;

As shown in FIG. 1, the closure including the cover 100 and the chassis 200. At least one cable fixer 300 is mounted in the chassis 200 for fixing cables to be spliced 10, 20 to the chassis 200 of the closure.

Figure 4:
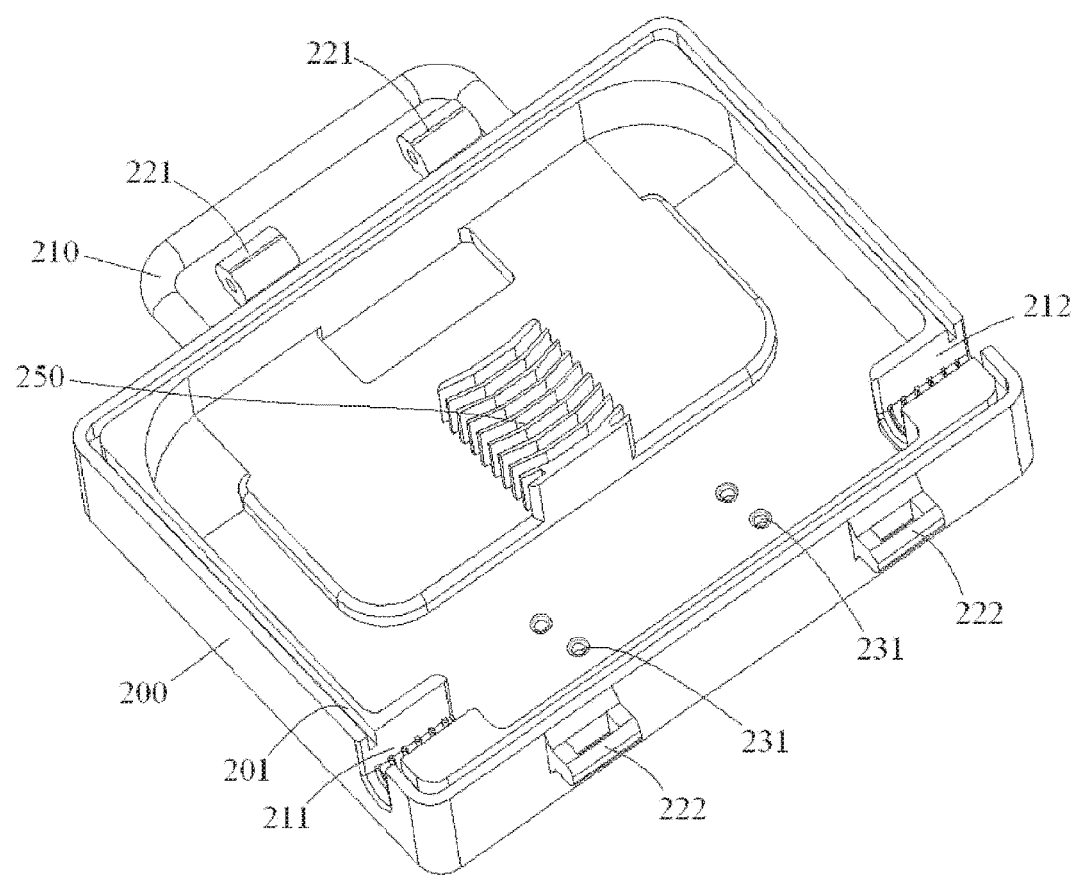
FIG. 4 shows a perspective view of the chassis of the fiber optic splice protection device in FIG. 1.
Figure 5A:
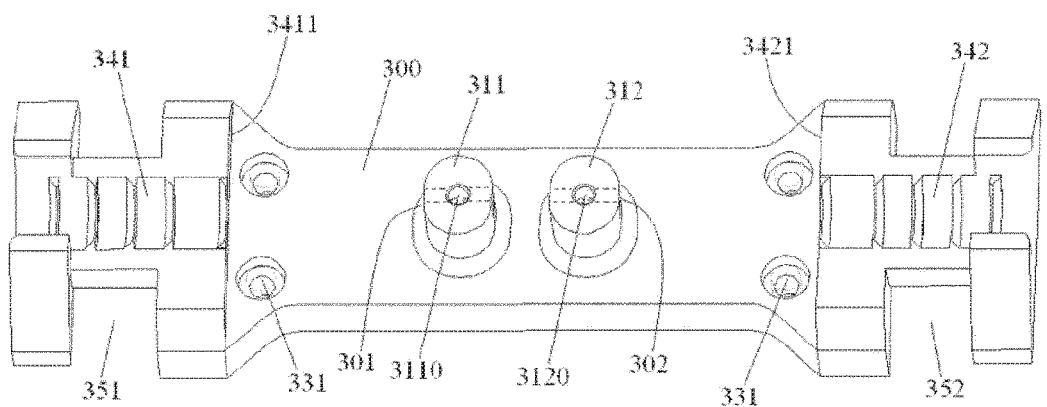
FIG. 5A shows a perspective schematic view of the cable fixer of the fiber optic splice protection device.
Figure 5B:
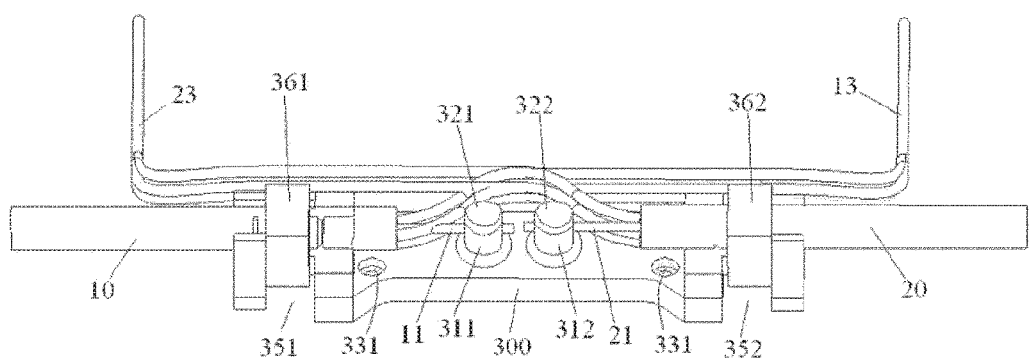
FIG. 5B shows a schematic view of previously fixing a strength member of the cable to be spliced and an outer sheath to the cable fixer.

FIG. 4 shows a perspective view of the chassis 200 of the fiber optic splice protection device in FIG. 1; FIG. 5A shows a perspective schematic view of the cable fixer 300 of the fiber optic splice protection device in FIG. 1; FIG. 5B shows a schematic view of previously fixing a strength members 11, 21 of the cable to be spliced 10, 20 and an outer sheath to the cable fixer 300.

Figure 2:
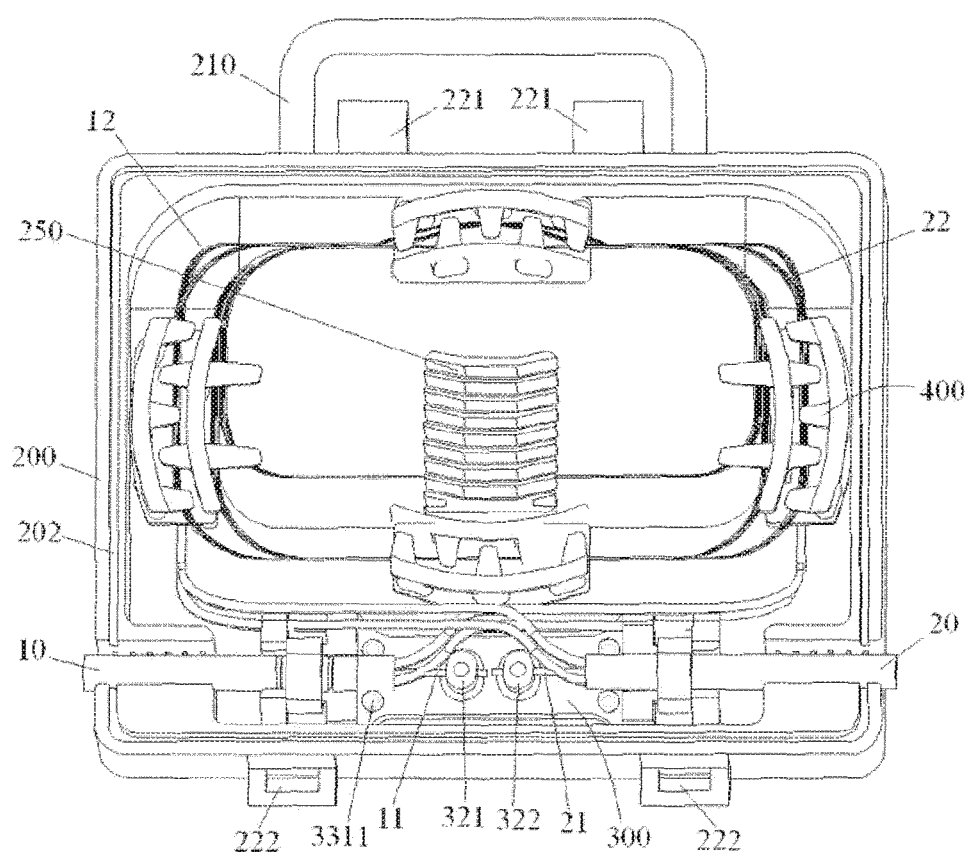
FIG. 2 shows a schematic diagram of a chassis of the fiber optic splice protection device in FIG. 1 and a cable fixer and a fiber routing management unit mounted on the chassis.

As shown in FIGS. 4, 5A and 5B, the cable fixer 300 is a separate member separated from the chassis 200, and is removably mounted in the chassis 200 of the closure. All strength members 11, 21 of the cables to be spliced 10, 20 are previously fixed to the cable fixer 300 before the cable fixer 300 is mounted to the chassis 200 of the closure. Then, as shown in FIG. 2, the cable fixer 300, on which the cables to be spliced 10, 20 are previously fixed, is fixed to the chassis 200 of the closure.

Please continue to refer to FIGS. 5A and 5B, each of the cable fixers 300 comprises a strength member fixation unit for fixing the strength members 11, 21 of the cables to be spliced 10, 20.

In the exemplary embodiment shown in FIG. 5B and FIG. 5A, the strength member fixation unit comprises cylindrical projections 311, 312 and threaded fasteners 321, 322. The cylindrical projections 311, 312 project from surface of the cable fixer 300, threaded bores 3110, 3120 extending along axial direction of the cylindrical projections 311, 312 and strength member holes 301 and 302 (shown in dashed line in FIG. 5A) penetrating through the threaded bores 3110, 3120 along radial direction of the cylindrical projections 311, 312 are formed on the cylindrical projections 311, 312, the strength members 11, 21 of the cable 10, 20 penetrate through the strength member holes 301 and 302. The threaded fasteners 321, 322 are screwed into the threaded bores 3110, 3120 of the cylindrical projection 311, 312 for fixing the strength members 11, 21 penetrated through the strength member holes 301 and 302 to the cylindrical projections 311, 312.

In the exemplary embodiments shown in FIGS. 5A and 5B, each of the cable fixers 300 further includes fastening strips 361, 362. The fastening strips 361, 362 bound the outer sheath of the cable 10, 20 to ends of the cable fixer 300.

As shown in FIGS. 5A and 5B, each of the cable fixers 300 has an elongated body. Cable receiving grooves 341, 342 extending along the longitudinal direction of the elongated body are respectively formed in two ends of the elongated body. The outer sheaths of the cable 10, 20 are accommodated in the cable receiving grooves 341, 342.

Necks 351, 352 inwardly contracted along width direction of the elongated body are respectively formed at two ends of the elongated body. The fastening strips 361, 362 are positioned at the neck 351, 352, and bound the outer sheath of the cable 10, 20 to the neck 351, 352.

As shown in FIG. 5A, the surface of the cable receiving grooves 341, 342 is uneven surface so as to increase frictional holding force.

As shown in FIG. 5A and FIG. 5B, intermediate portion of the elongated body is a flat portion, and its height is lower than that of two ends of the elongated body, so that projected positioning edges 3411, 3421 are formed at two ends of the intermediate portion of the elongated body. The positioning edges 3411, 3421 are used for determining length of the outer sheath of the cable 10, 20 fixed on the cable fixer 300.

As shown in FIGS. 2, 4, 5A and 5B, the cable fixer 300 is mounted to the chassis 200 of the closure by screws 3311.

As shown in FIGS. 5A and 5B, a plurality of fixation holes 331 are formed on the intermediate portion of the elongate body, and as shown in FIG. 4, threaded bores 231 corresponding to a plurality of fixation holes 331 are formed on bottom surface of the chassis 200 of the closure respectively. As shown in FIG. 2, bolts 3311 pass through the fixation holes 331 of the elongate body and screw into the threaded bores 231 of the chassis 200 so as to fix the cable fixer 300 to the chassis 200 of the closure.

Figure 6A:
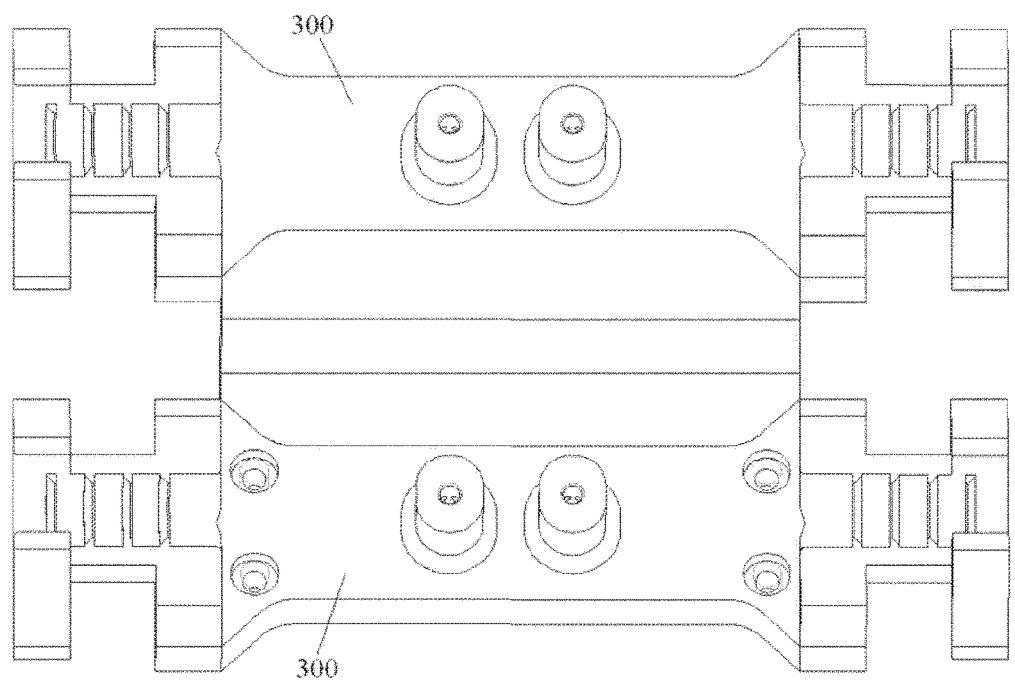
FIG. 6A shows a schematic diagram for simultaneously fixing a plurality of the cable fixer of a plurality of pairs of cables to be spliced.
Figure 6B:
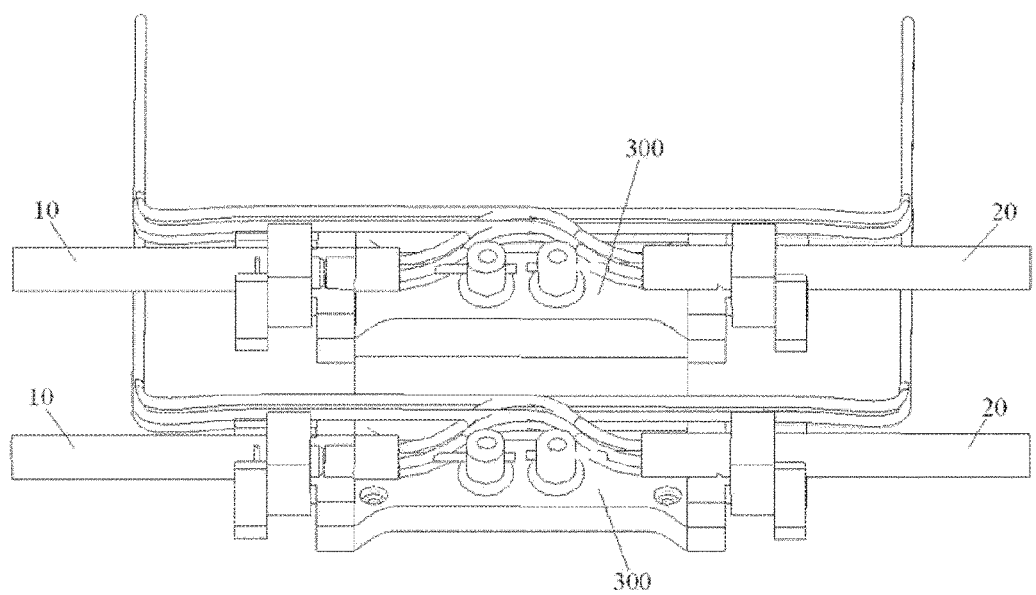
FIG. 6B shows a schematic view of previously fixing a strength member of the plurality of pairs of cables to be spliced and an outer sheath to the cable fixer.

FIG. 6A shows a schematic diagram for simultaneously fixing a plurality of the cable fixer 300 of a plurality of pair of cables to be spliced 10, 20; FIG. 6B shows a schematic view of previously fixing a strength member of the plurality of pairs of cable to be spliced 10, 20 and an outer sheath to the cable fixer 300.

In the embodiment shown in FIG. 6A and FIG. 6B, it comprises a plurality of cable fixers 300 as shown in FIGS. 5A and 5B for fixing the plurality of pairs of cables to be spliced 10, 20 to the chassis 200 of the closure.

Figure 7A:
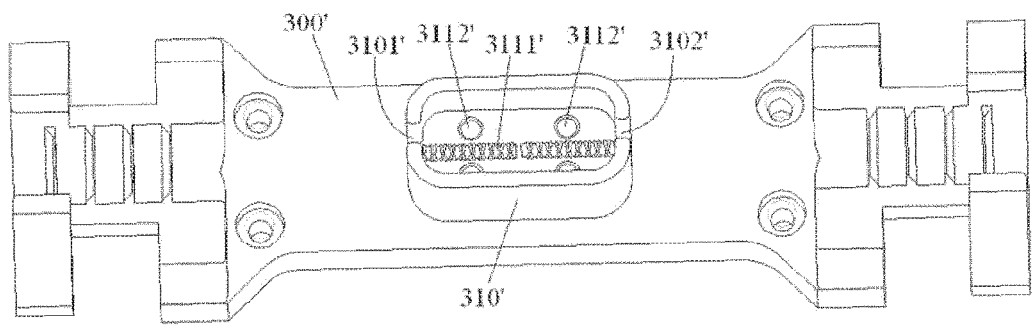
FIGS. 7A and 7B show schematic views of the cable fixer according to another exemplary embodiment of the present invention.
Figure 7B:
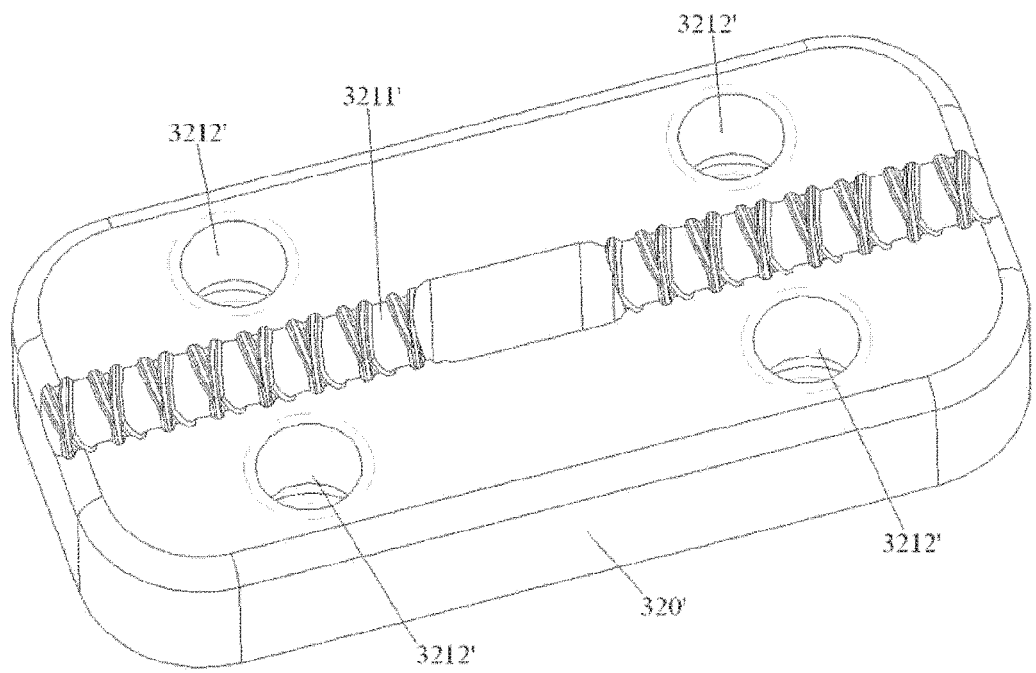
Figure 7C:
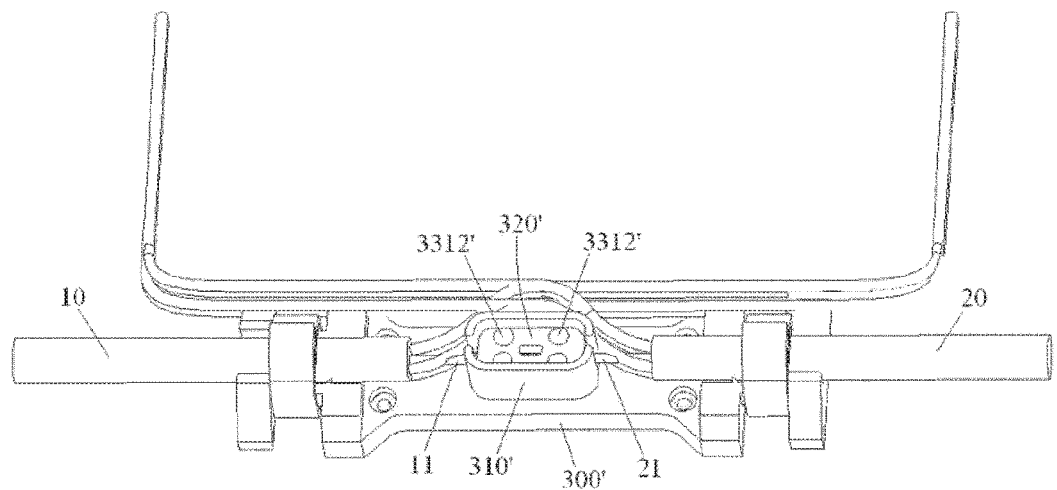
FIG. 7C shows a schematic view of fixing the strength member of the cable with the cable fixer in FIGS. 7A and 7B.

FIGS. 7A and 7B show schematic views of the cable fixer 300' according to another exemplary embodiment of the present invention; FIG. 7C shows a schematic view of fixing the strength members 11, 21 of the cables 10, 20 with the cable fixer 300' in FIGS. 7A and 7B;

In the embodiment shown in FIGS. 7A, 7B, and 7C, a strength member fixation unit comprises: a box-shaped accommodating portion 310' and a pressing block 320'. The box-shaped accommodating portion 310' is formed on the surface of the cable fixer 300, the box-shaped accommodating portion 310' has four walls projecting from the surface of the cable fixer 300, and strength member holes 3101', 3102' are formed on the end wall of the box-shaped accommodating portion 310', a first strength member fixation groove 3111' is formed on the bottom surface of the box-shaped accommodating portion 310', the strength members 11, 21 of the cables 10, 20 penetrates through the strength member holes 3101', 3102' and is accommodated in the first strength member fixation groove 3111'. The pressing block 320' is accommodated in the box-shaped accommodating portion 310' and is fastened to bottom of the box-shaped accommodating portion 310' by the screws 3312', so as to squeeze the strength members 11, 21 penetrated through the strength member holes 3101', 3102' of the box-shaped accommodating portion 310' into the first strength member fixation groove 3111'.

As shown in FIGS. 7A, 7B and 7C, the pressing block 320' is an integral member for squeezing and fixing the cables to be spliced 10, 20 to the strength members 11, 21.

Please continue to refer to FIGS. 7A, 7B and 7C, threaded bores 3112' are formed on bottom surface of the box-shaped accommodating portion 310', and fixing holes 3212' are formed on the pressing blocks 320', screws 3312' pass through the fixing hole 3212' of the pressing blocks 320' and screw into the threaded bores 3112' of the box-shaped accommodating portion 310', so as to fasten the pressing blocks 320' to bottom of the box-shaped accommodating portion 310'.

As shown in FIGS. 7A, 7B, and 7C, a second strength member fixation groove 3211' is formed on the pressing block 320'. The strength members 11, 21 are squeezed between the first strength member fixation groove 3111' and the second strength member fixation groove 3211'.

As shown in FIGS. 7A, 7B and 7C, surfaces of the first strength member fixation groove 3111' and/or the second strength member fixation groove 3211' are uneven surfaces so as to increase friction holding force for the strength members 11, 21.

Figure 8A:
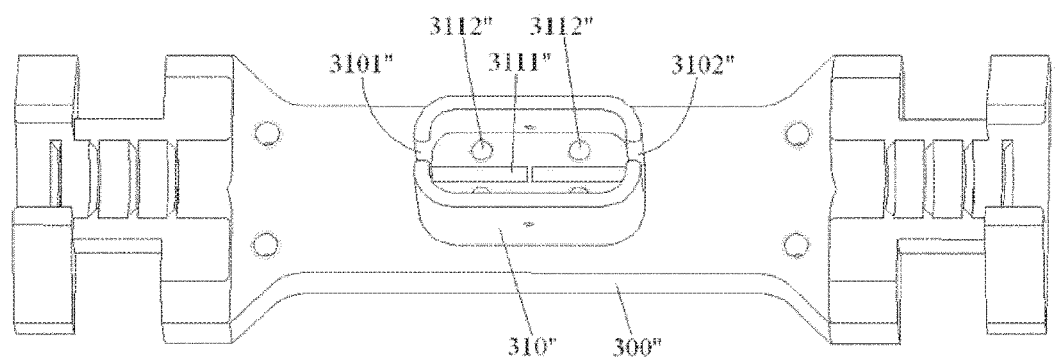
FIGS. 8A, 8B and 8C show schematic views of the cable fixer according to other exemplary embodiment of the present invention.
Figure 8B:
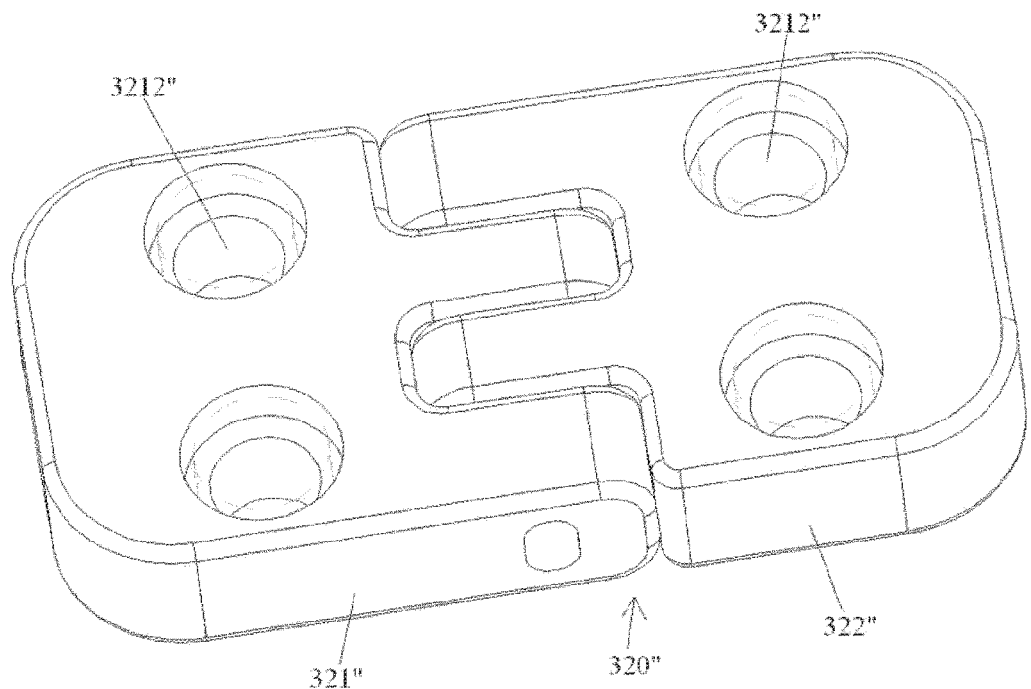
Figure 8C:
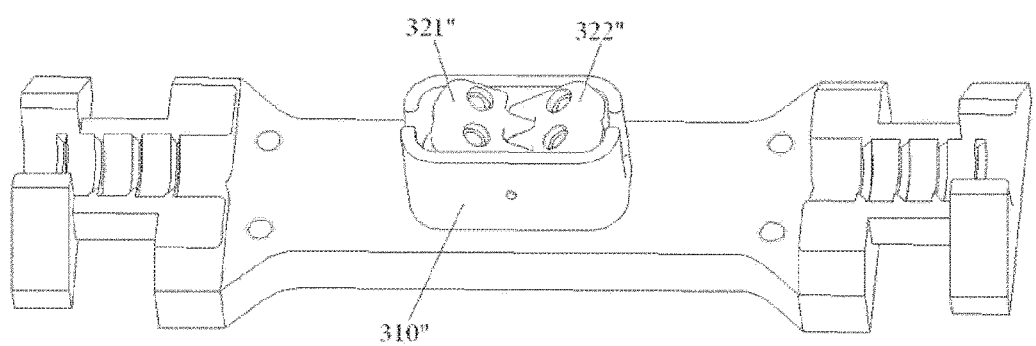
Figure 8D:
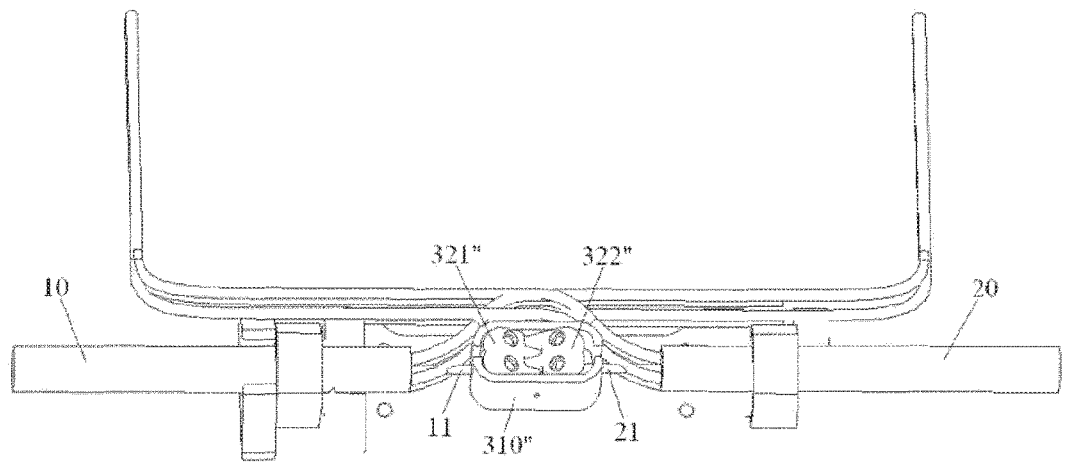
FIGS. 8D and 8E show schematic view of fixing the strength member of the cable with the cable fixer in FIGS. 8A, 8B and 8C.
Figure 8E:
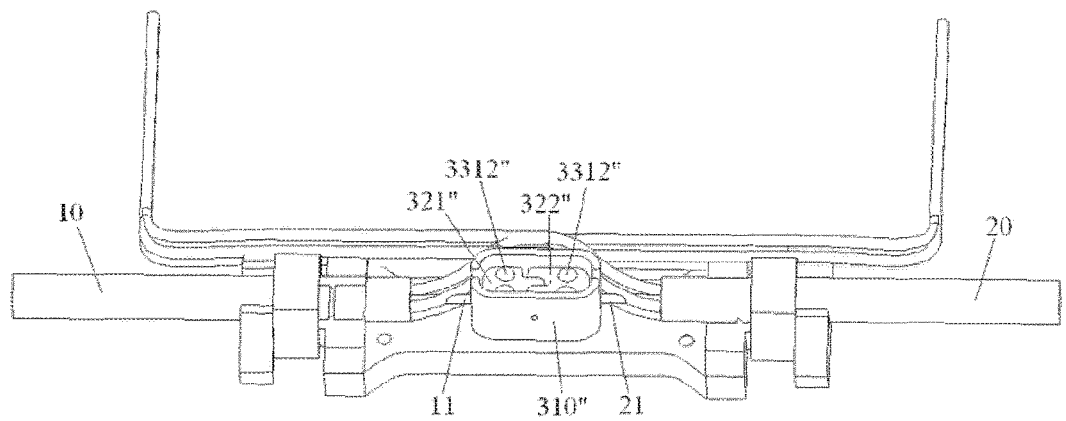

FIGS. 8A, 8B and 8C show schematic views of the cable fixer 300" according to other exemplary embodiment of the present invention; FIGS. 8D and 8E show schematic view of fixing the strength member of the cable with the cable fixer 300" in FIGS. 8A, 8B and 8C;

In the embodiment shown in FIGS. 8A, 8B, 8C, 8D and 8E, a strength member fixation unit 300" comprises: a box-shaped accommodating portion 310" and a pressing block 320". The box-shaped accommodating portion 310" is formed on the surface of the cable fixer 300, the box-shaped accommodating portion 310" has four walls projecting from the surface of the cable fixer 300", and strength member holes 3101', 3102' are formed on the end wall of the box-shaped accommodating portion 310", a first strength member fixation groove 3111" is formed on the bottom surface of the box-shaped accommodating portion 310", the strength members 11, 21 of the cables 10, 20 penetrates through the strength member holes 3101", 3102" and are accommodated in the first strength member fixation groove 3111". The pressing block 320" is accommodated in the box-shaped accommodating portion 310" and is fastened to bottom of the box-shaped accommodating portion 310" by the screw 3312", so as to squeeze the strength members 11, 21 penetrated through the strength member holes 3101", 3102" of the box-shaped accommodating portion 310" into the first strength member fixation groove 3111".

As shown in FIGS. 8A, 8B, 8C, 8D and 8E, the pressing blocks 320" includes a first block 321" and a second block 322", the first block 321" and the second block 322" are mutually pivotally connected together, and the first block 321" is used to individually squeeze and fix the strength members 11 of the first cable 10 of the cables to be spliced 10, 20, the second block 322" is used to individually squeeze and fix the strength members 21 of the second cable 20 of the cables to be spliced 10, 20, As shown in FIGS. 8A, 8B, 8C, 8D and 8E, threaded bores 3112" are formed on bottom surface of the box-shaped accommodating portion 310", and fixing holes 3212" are formed on the pressing blocks 320", screws 3312" pass through the fixing hole 3212" of the pressing blocks 320" and are screwed into the threaded bores 3112" of the box-shaped accommodating portion 310", so as to fasten the pressing blocks 320" to bottom of the box-shaped accommodating portion 310".

Although not shown, a second strength member fixation groove 3211" is also formed on the pressing blocks 320'. The strength members 11, 21 are squeezed between the first strength member fixation groove 3111" and the second strength member fixation groove 3211".

In one embodiment of the present invention, the surfaces of the first strength member fixation groove 3111" and/or the second strength member fixation groove 3211" are uneven surfaces so as to increase friction holding force for the strength members 11, 21.

According to another general concept of the present invention, there is provided a fiber optic splice protection device, comprising: a closure including a cover 100 and a chassis 200; and a fiber routing management unit 400, mounted on the chassis 200 of the closure, wherein the fiber routing management unit 400 comprises: a bottom sheet 401; flexible sheets 410, 420, which are removably mounted on top of the bottom sheet 401; and a elastic biasing member 403, mounted on the chassis 200 of the closure, for applying elastic biasing force to the bottom sheet 401, wherein the bottom sheet 401 is pressed against the fiber jackets 13, 23 of the cables to be spliced 10, 20 under the action of the elastic biasing member 403, so as to prevent the fiber jackets 13, 23 from being messily wound; and wherein optical fibers 12, 22 of the cables to be spliced 10, 20 are positioned above the bottom sheet 401, wound along a no bending loss path defined by the flexible sheets 410, 420, and restrained in an appropriate location by the flexible sheets 410, 420.

Figure 9A:
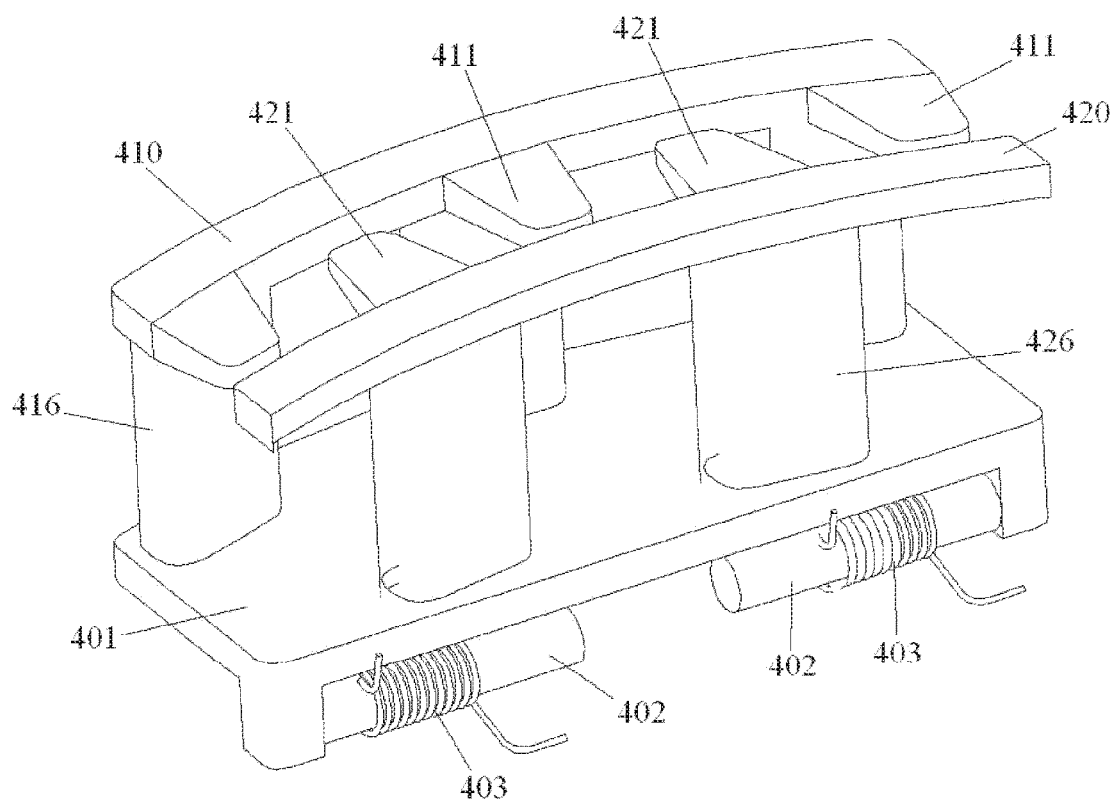
FIG. 9A shows a schematic diagram of the fiber routing management unit according to one exemplary embodiment of the present invention.

FIG. 2 shows a schematic diagram of a chassis 200 of the fiber optic splice protection device in FIG. 1 and a cable fixer 300 and a fiber routing management unit 400 mounted on the chassis 200; FIG. 9A shows a schematic diagram of the fiber routing management unit 400 according to one exemplary embodiment of the present invention.

As shown in FIG. 9A, in the illustrated embodiment, a fiber routing management unit 400 mainly comprises: a bottom sheet 401; flexible sheets 410, 420, which are removably mounted on top of the bottom sheet 401; and a elastic biasing member 403, mounted on the chassis 200 of the closure, for applying elastic biasing force to the bottom sheet 401, wherein the bottom sheet 401 is pressed against the fiber jackets 13, 23 of the cables to be spliced 10, 20 under the action of the elastic biasing member 403, for prevent the fiber jackets 13, 23 from being messily wound; and wherein optical fibers 12, 22 of the cables to be spliced 10, 20 are wound above the bottom sheet 401 along a no bending loss path defined by the flexible sheets 410, 420, and orderly restrained in an appropriate location by the flexible sheets 410, 420.

The present invention utilizes the bottom sheet 401 to separate the fiber jackets 13, 23 from the optical fibers 12, 22, not only to orderly manage the fiber jackets 13, 23 from the optical fibers 12, 22, but also to expand winding space of the optical fibers 12, 22, because the fiber optic 12, 22 may be coiled directly above the bottom sheet 401.

Please continue to refer to FIG. 9A, the elastic biasing member 403 comprises a pair of torque springs, a pair of mounting shafts 402 facing to each other are formed on one side of the bottom of the bottom sheet 401, and the pair of torque springs are respectively sets on the pair of mounting shafts 402.

Figure 10A:
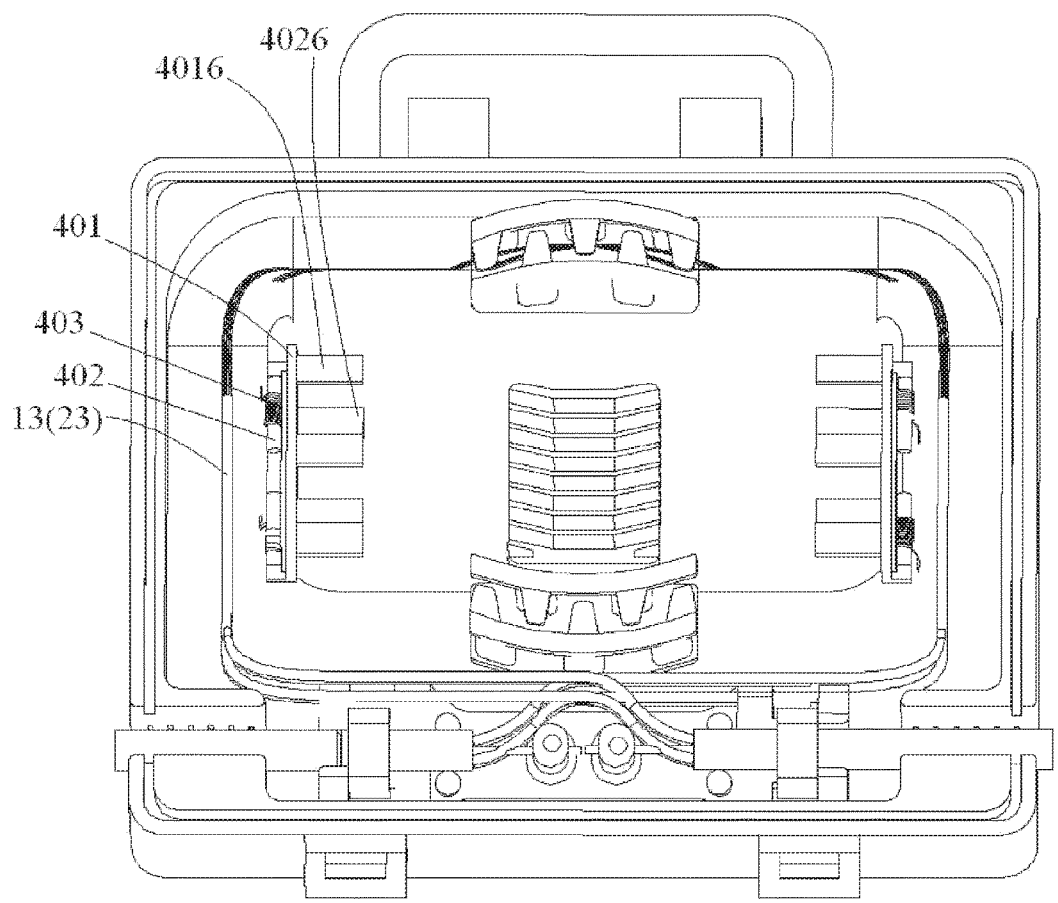
FIG. 10A shows a schematic diagram of positioning the fiber routing management unit in FIG. 9A on the chassis.
Figure 10B:
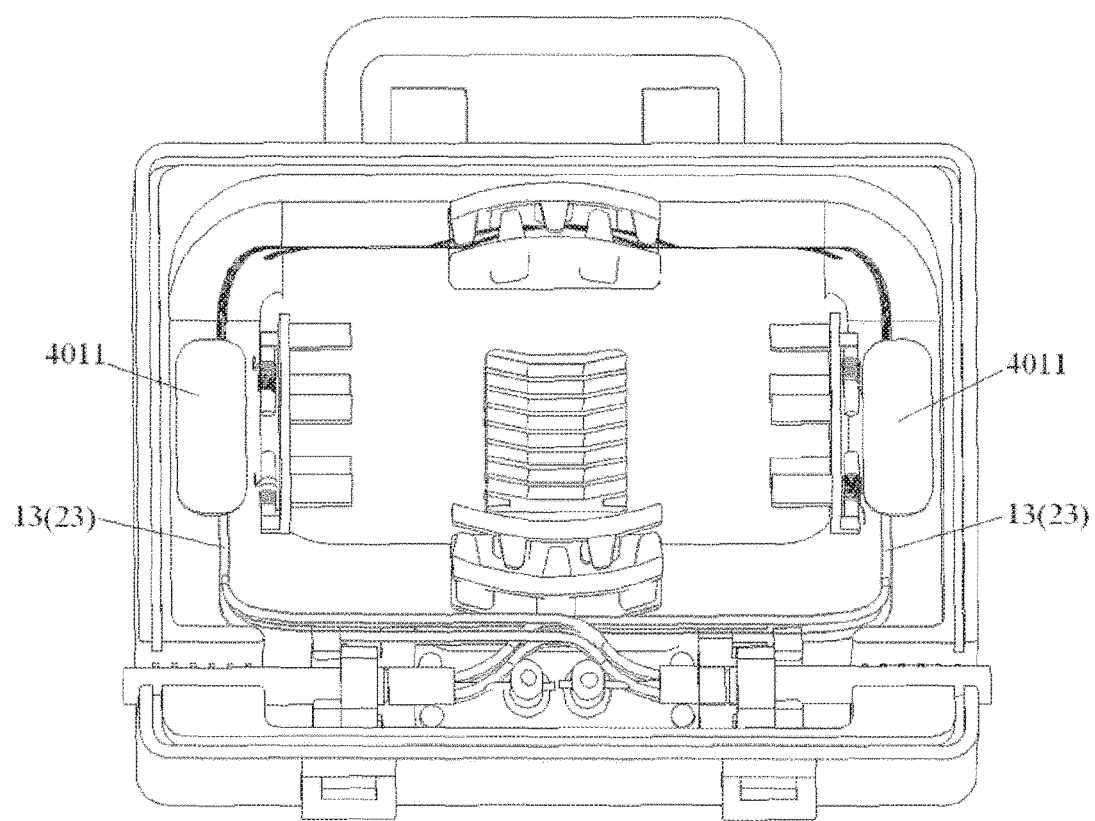
FIG. 10B shows a schematic diagram of the fiber routing management unit with a separate flexible pad according to other exemplary embodiment of the present invention.

As shown in FIG. 10A, a slot for fiber jacket is formed on bottom surface of the chassis 200 of the closure; fiber jackets 13, 23 are placed in the slot and are pressed below the bottom sheet 401. In one embodiment of the present invention, the bottom sheet 401 may be a flexible sheet-like member. However, the present invention is not limited to this, the bottom sheet 401 may be a rigid sheet-like member, when the bottom sheet 401 is a rigid sheet-like member, a flexible spacer may be provided under the bottom sheet 401, for example, as shown in FIG. 10B, the fiber routing management unit further includes a flexible spacer 4011, the flexible spacer 4011 covers on the fiber jackets 13, 23, and the bottom sheet 401 is pressed on the flexible spacer 4011.

As shown in FIGS. 9A and 10A, a plurality of protruded insertion sheet 4016, 4026 are formed on upper surface of the bottom sheet 401. Flexible sheets 416, 426 comprise legs 416, 426 and a plurality of teeth-like portion 411, 421 located at upper end of the leg portion. Insertion holes (not shown) are formed in lower end of the legs 416, 426, the insertion sheet 4016, 4026 are inserted into inserting holes, so that the flexible sheets 410, 420 are assembled to the bottom sheet 401.

Figure 9B:
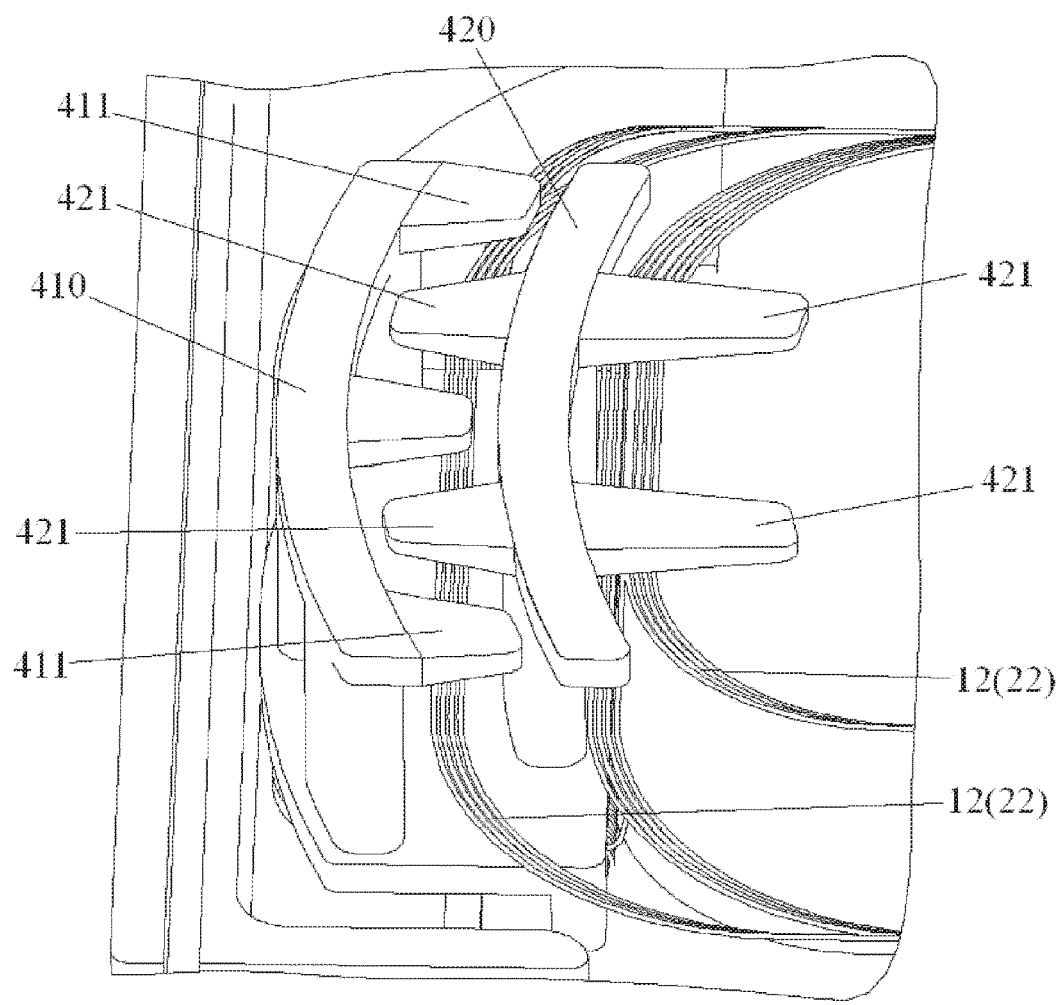
FIG. 9B shows a schematic diagram of the fiber routing management unit according to another exemplary embodiment of the present invention.
Figure 9C:
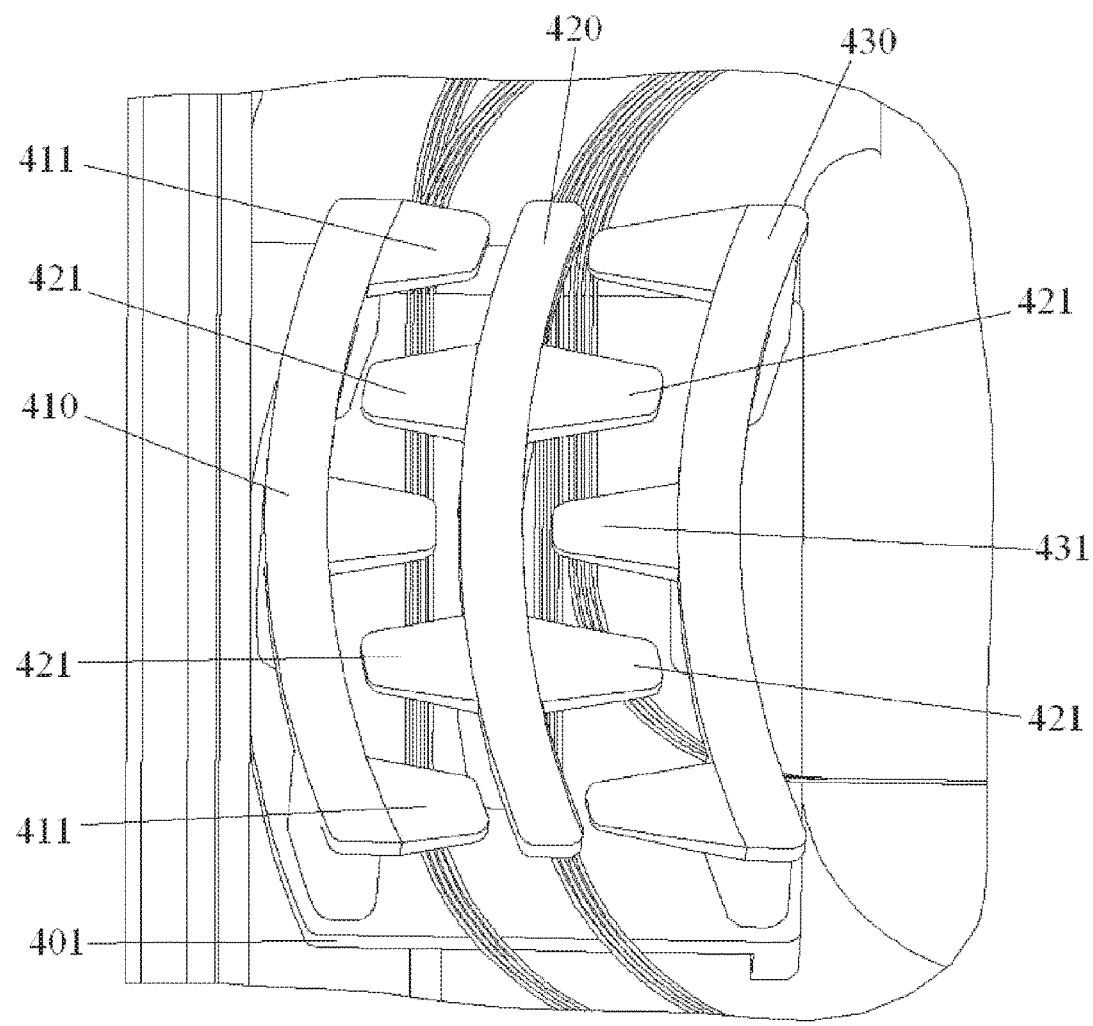
FIG. 9C shows a schematic diagram of the fiber routing management unit according to other exemplary embodiment of the present invention.

As shown in FIGS. 9A, 9B and 9C, a plurality of flexible sheets 410, 420 are provided at each of the bottom sheets 401, and teeth-like portions 411, 421 of adjacent two flexible sheets 410, 420 are alternately arranged.

As shown in FIGS. 9A and 9B, a first flexible sheet 410 and second flexible sheets 420 are mounted at each of the bottom sheets 401, and a first flexible sheet 410 and second flexible sheets 420 are spaced and faced with each other.

As shown in FIG. 2 and FIG. 9A, the first flexible sheet 410 is provided at a location near the side wall of the chassis 200 of the closure, and the second flexible sheet 420 is disposed at a side of the first flexible sheet 410 far away from the side wall of the chassis.

In the embodiment shown in FIG. 9A, a plurality of first teeth-like portions 411 are formed on only one side of the first flexible sheet 410 facing the second flexible sheets 420; and a plurality of second teeth-like portions 421 are formed on only one side of the second flexible sheet 420 facing the first flexible sheets 410.

In the embodiment shown in FIG. 9B, a plurality of first teeth-like portions 411 are formed on only one side of the first flexible sheet 410 facing the second flexible sheets 420; and a plurality of second teeth-like portions 421 are formed on one side of the second flexible sheet 420 facing the first flexible sheet 410 and the other side of the second flexible sheet 420 far away from the first flexible sheet 410. Thus, coiled optical fibers 12, 22 can be wound not only between the first flexible sheet 410 and second flexible sheet 420, but also the side of the second flexible sheet 420 far away from the first flexible sheet 410, so as to increases coiled space of the fiber optic 12 and 22.

In the embodiment shown in FIG. 9C, a third flexible sheet 430 is equipped on each of the bottom sheet 401, the third flexible sheet 430 is arranged inside of the second flexible sheet 420, and a plurality of third teeth-like portions 431 are only formed on one side of the third flexible sheet 430 facing the second flexible sheets 420.

As shown in FIGS. 2, 10A and 10B, two pairs of fiber routing management units 400 are mounted in the chassis 200 of the closure, in which one pair of fiber routing management units 400 are arranged in the middle of the longitudinal two ends of the chassis 200, and the other pair fiber routing management unit 400 are arranged in the middle of the transverse two ends of the chassis 200.

As shown in FIGS. 2, 10A and 10B, a row of holder 250 are formed in the middle of the chassis 200 of the closure for holding fiber optic splice protection jacket (not shown, can be heat-shrinkable tube).

According to another general concept of the present invention, there is provided a fiber optic splice protection device comprising: a closure including a cover 100 and a chassis 200. Wherein a circle of groove 201 is formed on mating edge of four walls of one of the cover 100 and the chassis 200; a circle of projection 102 is formed on mating edge of four walls of another of the cover 100 and the chassis 200; the cover 100 is locked on the chassis 200 in the way of locking, when the cover is locked on the chassis 200, the projection 102 is pressed against the elastic sealing member 202 and is embedded into the groove 201 in order to achieve the seal locking between the cover 100 and the chassis 200.

Figure 3:
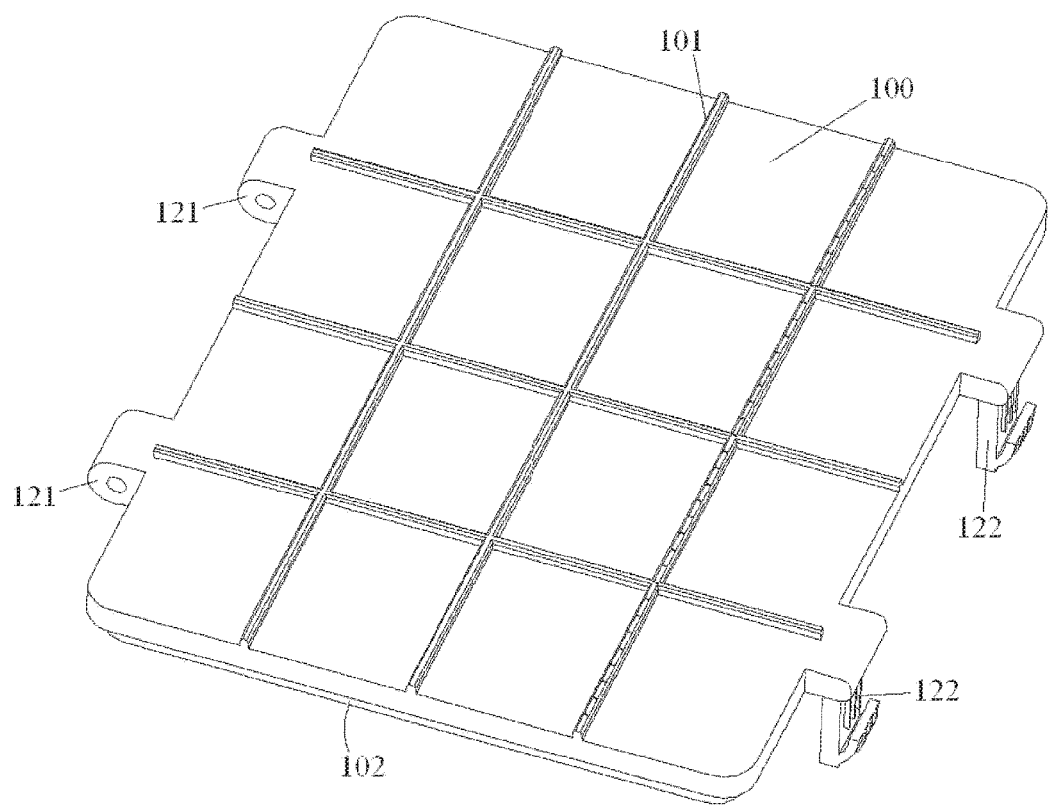
FIG. 3 shows a schematic perspective view of a cover of the fiber optic splice protection device.

FIG. 3 shows a schematic perspective view of the cover 100 of a fiber optic splice protection device shown in FIG.

Figure 11:
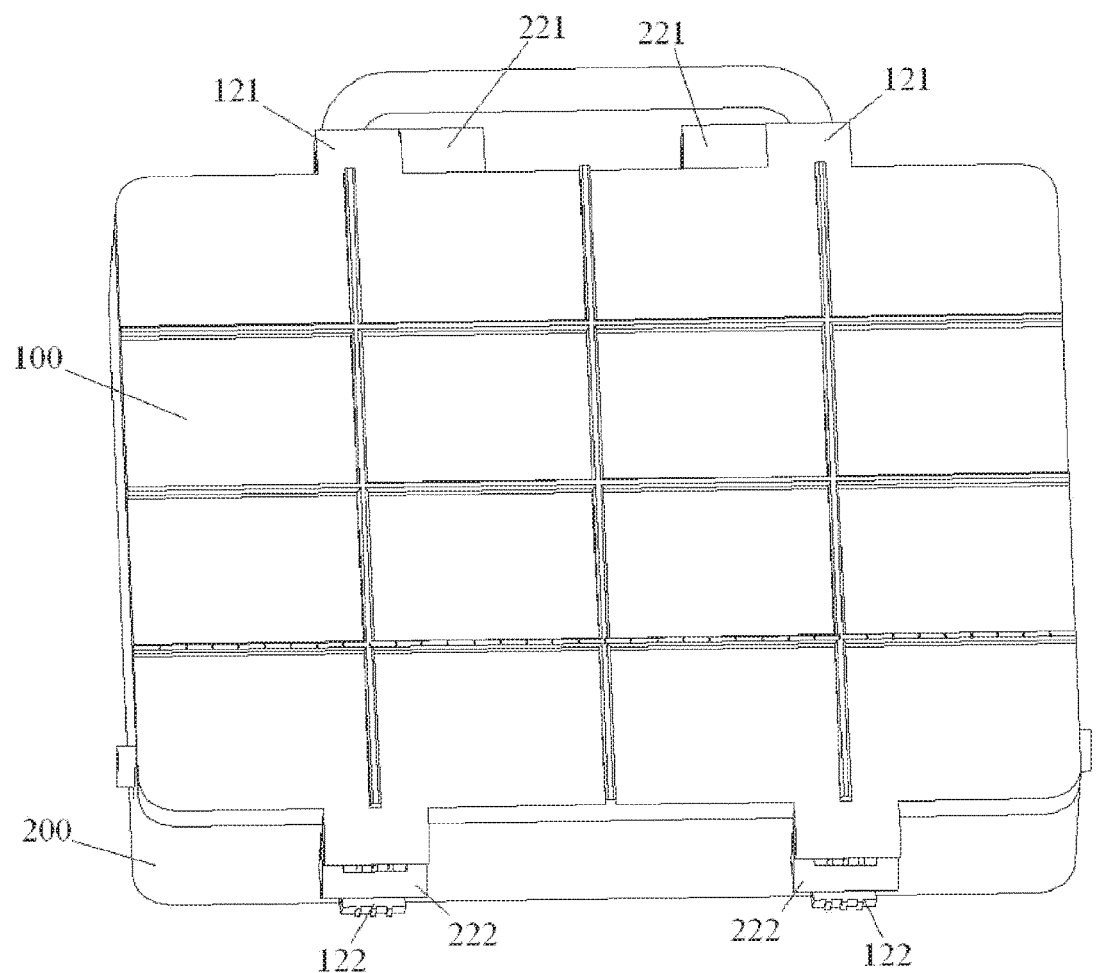
FIG. 11 shows a schematic diagram of the cover and the chassis of the fiber optic splice protection device in FIG. 1 closed together.

1. FIG. 11 shows a schematic view of the cover and the chassis closed together of a fiber optic splice protection device shown in FIG. 1.

As shown in FIGS. 1, 3 and 4, a circle of groove 201 is formed on upper mating edge of four walls of the chassis 200, and an elastic sealing member 202 is placed in the groove 201. A circle of projections 102 is formed on lower mating edge of four walls of the cover 100. The cover 100 is locked in the chassis 200 in locking manner, as shown in FIG. 11, when the cover is locked on the chassis 200, the projections 102 on the cover 100 is pressed on the elastic sealing member 202 and is embedded in the groove 201 in order to achieve seal locking between the cover 100 and the chassis 200.

However, the present invention is not limited to the illustrated embodiment, in another embodiment of the present invention, a circle of projections is formed on upper mating edge of four walls of the chassis, and a circle of groove is formed on lower mating edge of four walls of the cover.

In an exemplary embodiment of the present invention, the cover 100 is locked to at least one side of the chassis 200 by a locking device.

Please continue to refer to FIG. 1, FIG. 3, FIG. 4 and FIG. 11, in the illustrated embodiment, one side of the cover 100 and the chassis 200 pivotally connected together by a hinge, and the other side of the cover 100 and the chassis 200 are mutually locked together through the locking device.

As shown in FIGS. 1, 3, 4 and 11, the locking device comprises a snap structure, and the snap structure comprising: an elastic hooks 122 formed on the cover 100; and a notch 222 formed in the chassis, wherein when the elastic hook 122 is inserted and snapped into the notch 222, the cover 100 and chassis 200 are locked together.

Figure 12:
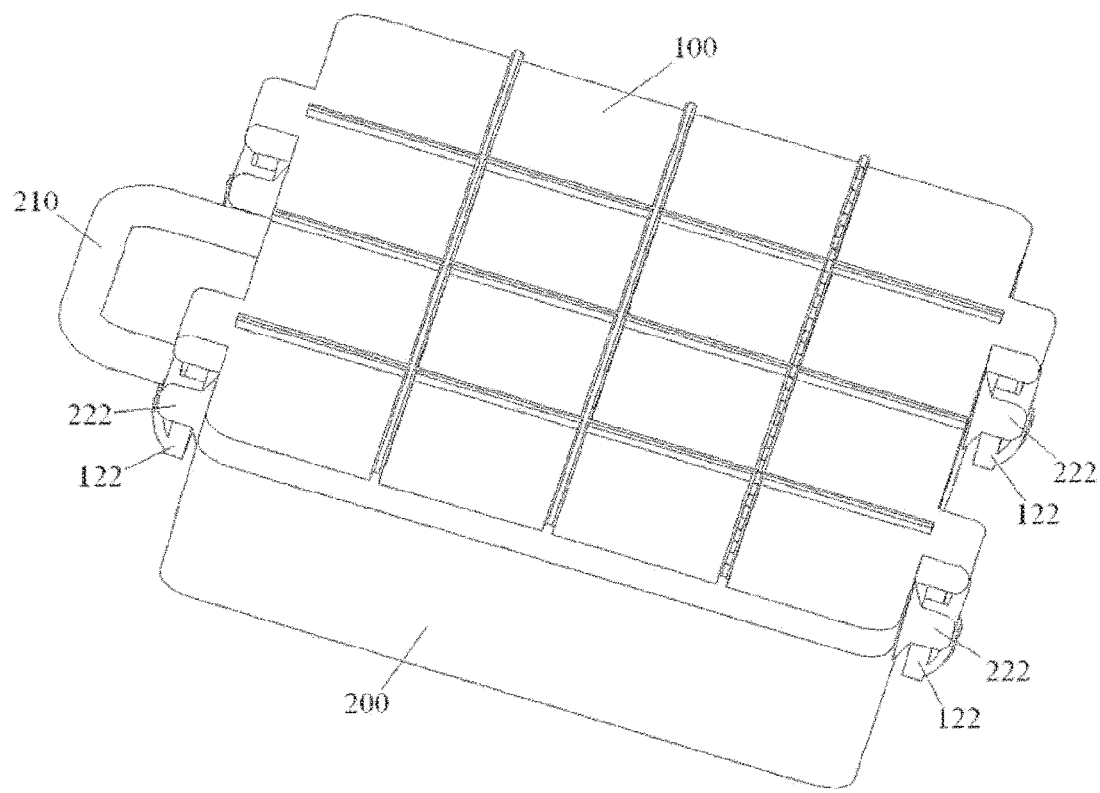
FIG. 12 shows a schematic diagram of a locking structure of the cover and the chassis of the fiber optic splice protection device according to another exemplary embodiment of the present invention.
Figure 13A:
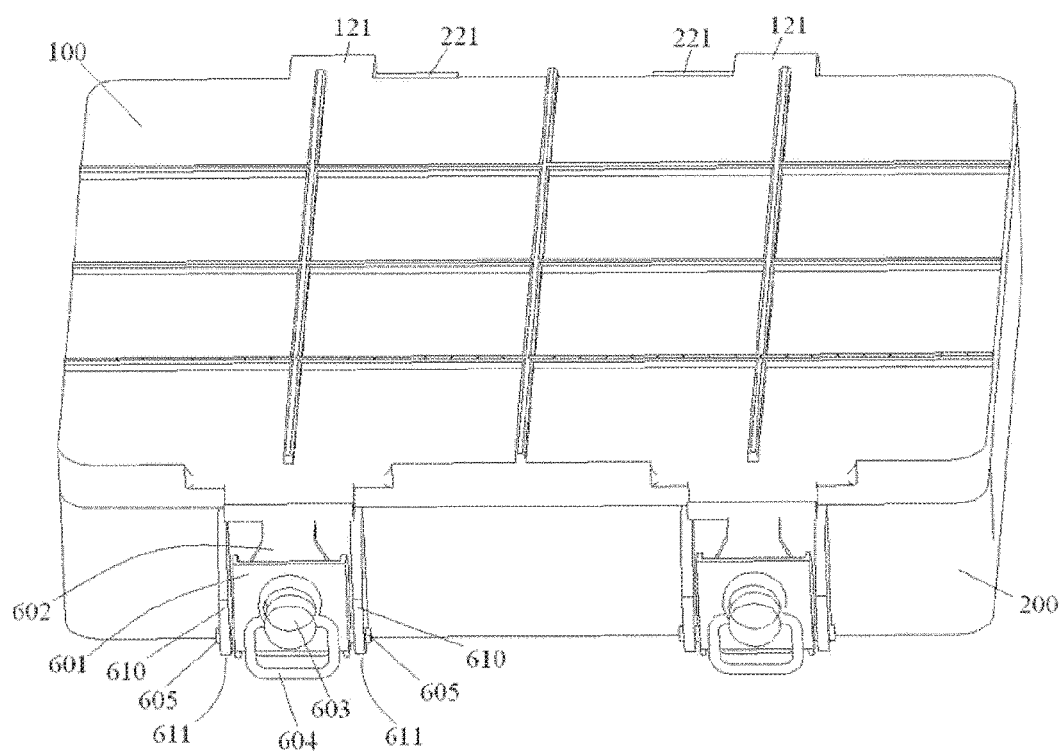
FIG. 13A shows a schematic diagram of a locking structure of the cover and the chassis of the fiber optic splice protection device according to other exemplary embodiment of the present invention, wherein the cover and the chassis are in a locked position.
Figure 13B:
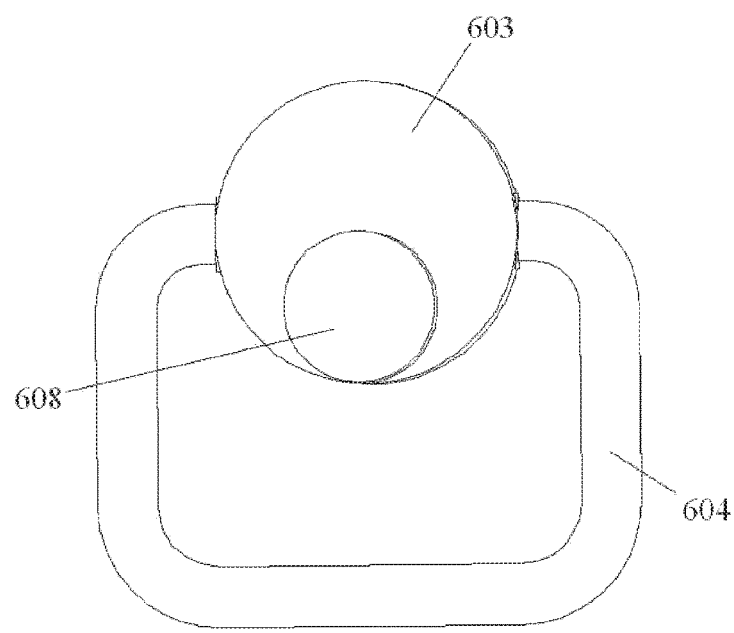
FIG. 13B shows position of the eccentric cam member when the cover and the chassis in the locked position.
Figure 13C:
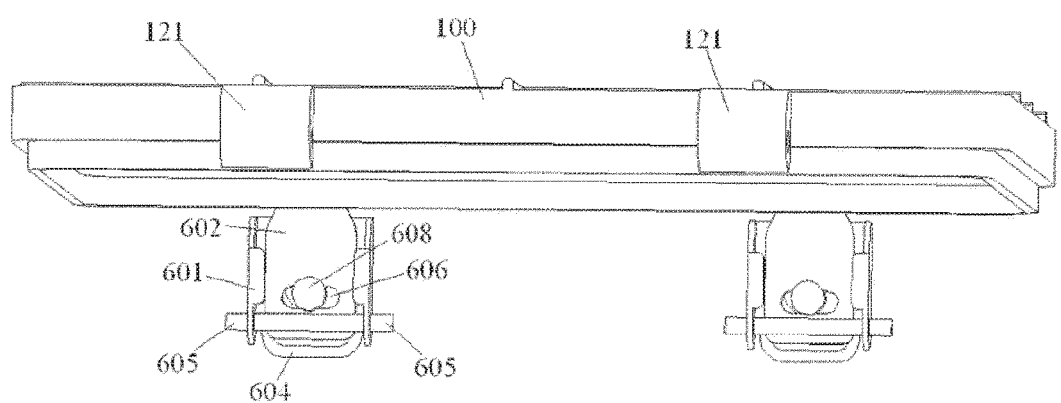
FIG. 13C shows an inner side view of an cam locking mechanism when the cover and the chassis in the locked position.
Figure 14A:
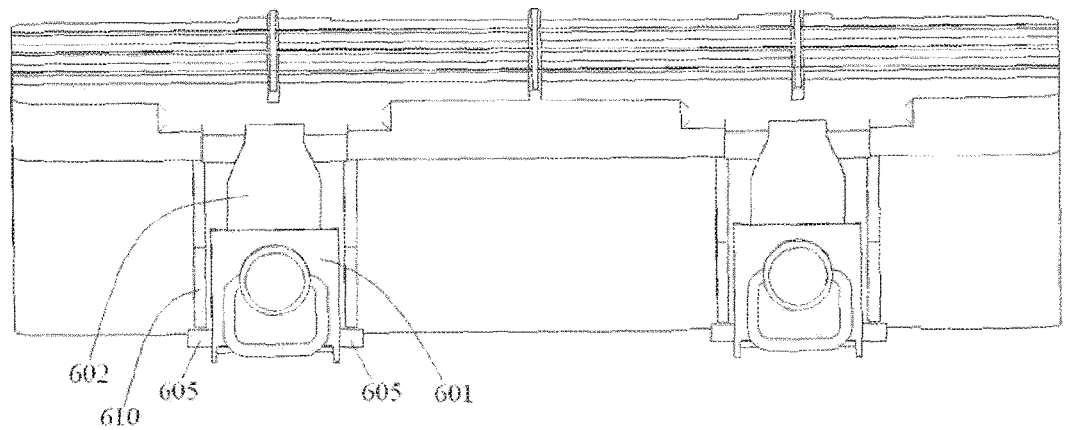
FIG. 14A shows a schematic diagram of a locking structure of the cover and the chassis of the fiber optic splice protection device according to other exemplary embodiment of the present invention, wherein the cover and the chassis are in an unlocked position.
Figure 14B:
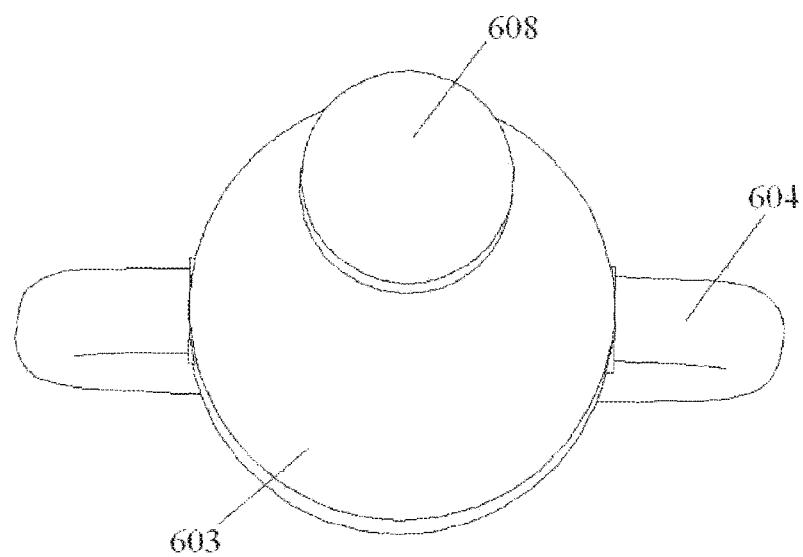
FIG. 14B shows position of the eccentric cam member when the cover and the chassis in the unlocked position.
Figure 14C:
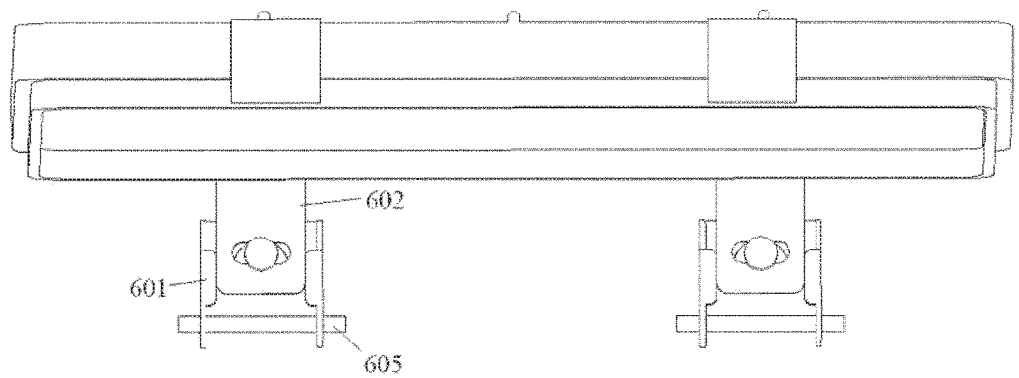
FIG. 14C shows an inner side view of an cam locking mechanism when the cover and the chassis in the unlocked position.

FIG. 12 shows a schematic view of the locking structure of the cover and the chassis of the fiber optic splice protection device according to another exemplary embodiment of the present invention.

As shown in FIG. 12, the cover 100 and one side of the chassis 200 are locked to each other by a locking device, and the cover 100 and the other side of chassis 200 are also locked to each other by a locking device.

FIGS. 13A, 13B, 13C, FIGS. 14A, 14B and 14C show schematic diagrams of a locking structure of the cover and the chassis of the fiber optic splice protection device according to other exemplary embodiment of the present invention.

As shown in FIG. 13A, FIG. 13B, FIG. 13C, FIGS. 14A, 14B and 14C, the locking device is a cam locking mechanism, the cam locking mechanism comprises: a snapping plate 602, connected to the cover 100; a sliding plate 601 slidably mounted on the snapping plate 602 and can slide along the snapping plate 602; a rotating circular plate 603 rotatably mounted on the sliding plate 601; an eccentric cam member 608, connected to the rotating circular plate 603 and offset from the center of the rotating circular plate 603 by a predetermined distance, and the eccentric cam member 608 is joined to the notch 606 formed on the snapping plate 602; shaft member 605 connected to the lower end of the sliding plate 601; and a slot 611 formed on the chassis 200, the shaft member 605 is retained to the slot 611, wherein the eccentric cam member 608 can move between a locked position (the position shown in FIGS. 13A, 13B and 13C) locking the cover 100 and the chassis 200, and an unlocked position (the position shown in FIG. 14A, FIG. 14B and FIG. 14C) releasing the cover 100 and chassis 200, when the rotating circular plate 603 is rotated; and wherein, when the eccentric cam member 608 moves toward the locked position, the eccentric cam member 608 drives the sliding plate 601 and the snapping plate 602 to moves in a direction for closing to each other, so as to apply tension force to the cover 100 and the chassis 200 for achieving the locking between the cover 100 and the chassis 200; and wherein the eccentric cam member 608 drives the sliding plate 601 and the snapping plate 602 to moves toward a direction for separating from each other so as to release the cover 100 and chassis 200 when the eccentric cam member 608 is moving toward the unlocked position.

As shown in FIG. 13A, FIG. 13B, FIG. 13C, FIG. 14A, FIG. 14B and FIG. 14C, a rotating wrench 604 is connected to the rotating circular plate 603, for applying a rotational force to the rotating circular plate 603.

As shown in FIG. 13A, FIG. 13B, FIG. 13C, FIGS. 14A, 14B and 14C, a pair of rib projections 610 are formed on side of the chassis 200, and the sliding plate 601 and the snapping plate 602 of each cam locking mechanism are located between corresponding pair of projecting ribs 610.

As shown in FIG. 13A, FIG. 13B, FIG. 13C, FIGS. 14A, 14B and 14C, the slot 611 is formed on the lower end of each pair of projecting ribs 610, two ends of the shaft member 611 are locked into the slot 611.

Figure 15:
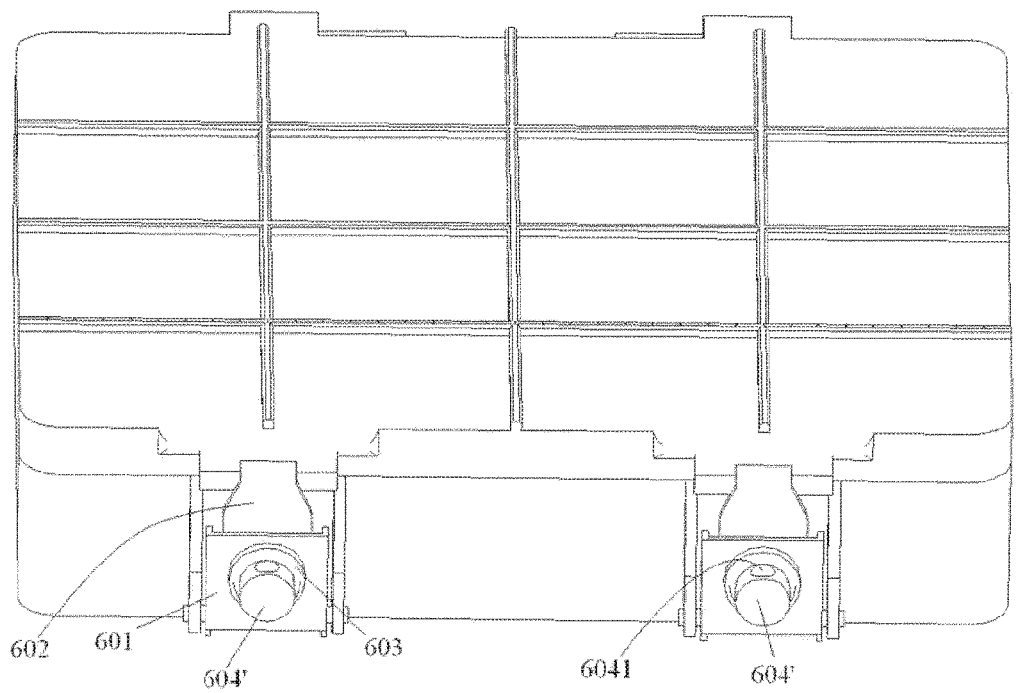
FIG. 15 shows a schematic diagram of a locking structure of the cover and the chassis of the fiber optic splice protection device according to other exemplary embodiment of the present invention.

FIG. 15 shows a schematic diagram of a locking structure of the cover and the chassis of the fiber optic splice protection device according to other exemplary embodiment of the present invention;

As shown in FIG. 15, an insertion hole 6041 is formed in the rotating circular plate 603, for inserting a force arm tool into the insertion hole 6041, so as to impart a rotational force to the rotating circular plate 603 by the force arm tool.

In the embodiment shown in FIG. 13A, FIG. 13B, FIG. 13C, FIGS. 14A, 14B and 14C, the eccentric cam member 608 has disk-shape and has a diameter smaller than that of the rotating circular plate 603.

Figure 16:
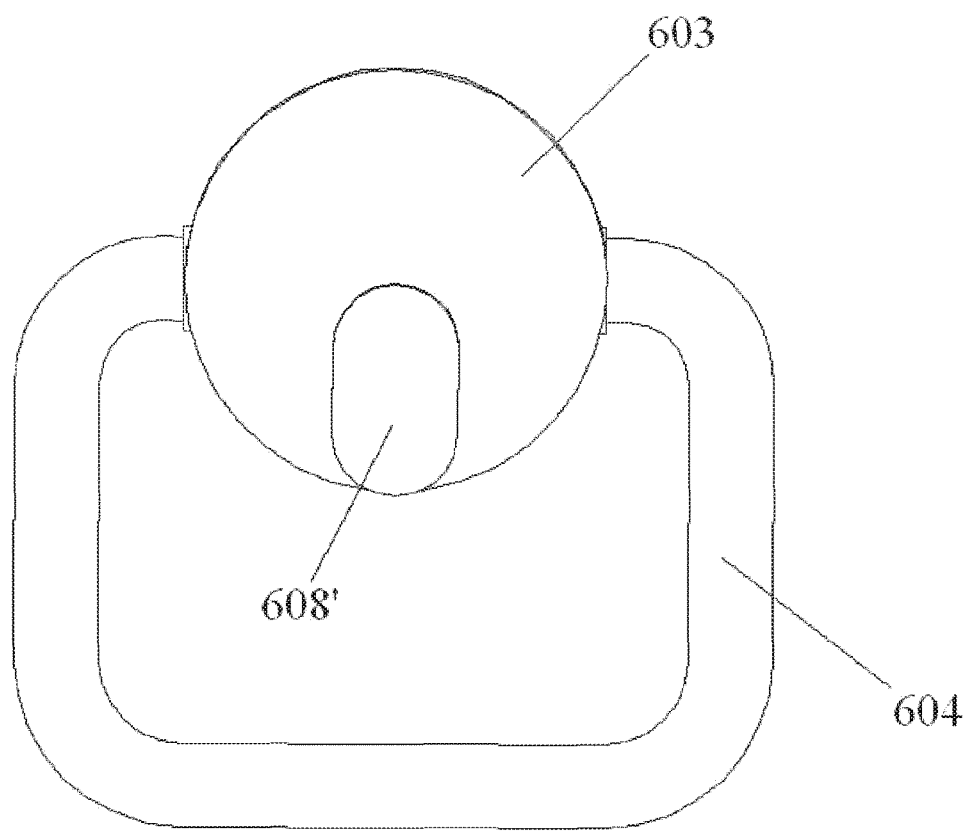
FIG. 16 shows a schematic diagram of the eccentric cam member according to other exemplary embodiment of the present invention.

FIG. 16 shows a schematic diagram of the eccentric cam member according to other exemplary embodiment of the present invention.

In the embodiment shown in FIG. 16, the eccentric cam member 608 has oval-shape, and its major-axis length is less than the diameter of the rotating circular plate 603.

Referring to FIG. 4 and FIG. 2, cable receiving slots 211, 212 are formed on the side wall of the chassis 200, the cables to be spliced 10, 20 are accommodated in the cable receiving slots 211, 212.

As shown in FIG. 1, the outer side wall of the chassis 200 is formed with a holder knob 210.

As shown in FIG. 3, a number of mutually crossing longitudinal and transverse strength ribs 101 are formed on the outer surface of the cover 100.

As shown in FIG. 3, a ruler is on the strength ribs, to provide on-site installation measurement function, for easy on-site installation without need to carry a separate length measuring tools. Those skilled in the art will appreciate, the above-described embodiments are exemplary, and those skilled in the art can improve it, and the structure described in various embodiments can be freely combined without structure or principle conflict occurred.

Although the drawings of the present invention has been described, but embodiments disclosed in the figures are intended to be illustrative description of the preferred embodiments of the present invention, and not be construed as a limitation of the present invention.

Although several embodiments of the present general inventive concept have been shown and described, those skilled in the art will appreciate, these embodiments of the present invention may be changed without departing from the principles and spirit of the general inventive concept of the case, the scope of the present invention is defined by claims and their equivalents.

It should be noted that the wording "comprising" does not exclude other elements or steps, the phrase "a" or "an" does not exclude plurality. Further, any references in claims should not be construed as limiting the scope of the invention.

What is claimed is:

1. A device for protecting fiber optic cables to be spliced, comprising:
a closure including a cover and a chassis; and
a fiber routing management unit, mounted on the chassis of the closure, wherein the fiber routing management unit comprises:
a bottom member;
flexible clippers, which are removably mounted on top of the bottom member; and
an elastic biasing member, mounted on the chassis of the closure, for applying elastic biasing force to the bottom member;
wherein the bottom member is pressed against jackets of the fiber optic cables under the action of the elastic biasing member for organized winding of the cables; and
wherein the fiber optic cables are positioned above the bottom member and wound along a no bending loss path defined by the flexible clippers, and are restrained by the flexible clippers.

2. The device of claim 1, wherein:
the elastic biasing member includes a pair of torque springs respectively mounted on a pair of mutually facing mounting shafts that are formed on one side of the bottom member.

3. The device of claim 2, further comprising:
a slot for cable jacket formed on bottom surface of the chassis of the closure.

4. The device of claim 3, wherein:
the bottom member is a flexible sheet-like member.

5. The device of claim 4, wherein:
the fiber routing management unit further includes a flexible spacer and the bottom member is pressed on the flexible spacer.

6. The device of claim 4, wherein:
a plurality of protruded insertion sheets are formed on an upper surface of the bottom member;
the flexible clippers comprise legs and a plurality of teeth-like portions located at an upper end of the legs;
insertion holes are formed at a lower end of the legs;
the insertion sheets are inserted into the insertion holes, so that the flexible clippers are assembled to the bottom member.

7. The device of claim 6, wherein:
a plurality of flexible clippers having teeth-like portions are mounted to the bottom member in an adjacent arrangement; and
wherein the teeth-like portions of the flexible clippers are alternately arranged with respect to each other.

8. The device of claim 7, wherein:
a first flexible clipper and a second flexible clipper are mounted at each of the bottom members, wherein the first flexible clipper and the second flexible clipper are spaced and faced each other.

9. The device of claim 8, wherein:
the first flexible clipper is provided at an outer side of the chassis near the closure, and the second flexible clipper is disposed at an inner side of the first flexible clipper.

10. The device of claim 9, wherein:
a plurality of first teeth-like portions are formed at only one side of the first flexible clipper, wherein the first teeth-like portions face the second flexible clipper; and
a plurality of second teeth-like portions are formed only at one side of the second flexible clipper facing the first flexible clipper.

11. The device of claim 9, wherein:
a plurality of first teeth-like portions are formed at only one side of the first flexible clipper facing the second flexible clipper; and
a plurality of second teeth-like portions are formed both at one side of the second flexible clipper facing the first flexible clipper and another side facing away from the first flexible clipper.

12. The device of claim 11, wherein:
a third flexible clipper is equipped the bottom member, the third flexible clipper is arranged inside of the second flexible clipper, and
a plurality of third teeth-like portions are formed on only one side of the third flexible clipper facing the second flexible clipper.

13. The device of claim 12, wherein:
two pairs of fiber routing management units are mounted in the chassis of the closure, in which one pair of fiber routing management units is arranged in the middle of two longitudinal ends of the chassis, and the other of the pair of fiber routing management units is arranged in the middle of two transverse ends of the chassis.

14. The device of claim 12, wherein:
a row of holders is formed in the middle of the chassis of the closure for holding fiber optic splice protection jackets.

15. The device of claim 1, wherein the device includes a plurality of the fiber routing management units mounted to the chassis of the closure.

16. A device for protecting fiber optic cables to be spliced, comprising:
a closure including a cover and a chassis; and
a fiber routing management unit, mounted on the chassis of the closure, wherein the fiber routing management unit comprises:
a bottom member;
at least two clipper members removably mounted on top of the bottom member, wherein the top and bottom member are configured such that fiber optic cables can be positioned above the bottom member and wound along a no bending loss path defined by the at least two clippers and can be restrained by the at least two clipper members; and
an elastic biasing member, mounted on the chassis of the closure, for applying elastic biasing force to the bottom member;
wherein the bottom member is configured to be pressed against jackets of the fiber optic cables under the action of the elastic biasing member.

17. The device of claim 1, wherein the fiber routing management unit includes a plurality of fiber routing management units.

* * * * *